United States Patent
Yuan et al.

(10) Patent No.: US 12,515,527 B2
(45) Date of Patent: Jan. 6, 2026

(54) REDUNDANT POWER SUPPLIES FOR AN AUTONOMOUS DRIVING SYSTEM

(71) Applicant: Apollo Autonomous Driving USA LLC, Sunnyvale, CA (US)

(72) Inventors: Baoping Yuan, Sunnyvale, CA (US); Yongqiang Wang, Sunnyvale, CA (US); Yaoming Shen, Sunnyvale, CA (US)

(73) Assignee: Apollo Autonomous Driving USA LLC, Sunnyvale, CA (US)

(*) Notice: Subject to any disclaimer, the term of this patent is extended or adjusted under 35 U.S.C. 154(b) by 67 days.

(21) Appl. No.: 18/540,758

(22) Filed: Dec. 14, 2023

(65) Prior Publication Data
US 2025/0196646 A1    Jun. 19, 2025

(51) Int. Cl.
*B60L 3/00*    (2019.01)
*B60W 60/00*   (2020.01)

(52) U.S. Cl.
CPC ......... *B60L 3/0046* (2013.01); *B60W 60/001* (2020.02)

(58) Field of Classification Search
CPC ............................ B60L 3/0046; B60W 60/001
See application file for complete search history.

(56) References Cited

U.S. PATENT DOCUMENTS

| 2023/0174041 A1* | 6/2023 | Cronin | G01C 21/3837 701/22 |
| 2023/0411991 A1* | 12/2023 | Mori | H02J 9/068 |
| 2024/0338331 A1* | 10/2024 | Ghosh Dastidar | G06F 13/4282 |

FOREIGN PATENT DOCUMENTS

EP    3858654 A1 *   8/2021   ............... B60L 1/00

* cited by examiner

*Primary Examiner* — Rexford N Barnie
*Assistant Examiner* — Duc M Pham
(74) *Attorney, Agent, or Firm* — Oppedahl Patent Law Firm LLC

(57) ABSTRACT

Embodiments presented herein include systems, methods, and non-transitory computer-readable medium or media for controlling power for a vehicle that utilizes one or more computing systems for control, such as an autonomous vehicle. Embodiments comprise multi-tiered distributed power supplies. In one or more embodiments, the overall power system may be structured into distinct levels for enhanced reliability and efficiency. Certain power systems may be tasked with supporting certain systems of the vehicle, which may be correlated to the amount of power (i.e., maximum power and duration) the tier can supply. Because of the inherent risks related to vehicles, a paramount emphasis of the power system design and operation is related to safety. In one or more embodiments, a safety power supply is included as a backup system and may be used to perform one or more safety shutdown procedures.

12 Claims, 20 Drawing Sheets

| Power Supply System | | | | Actions | | | | |
|---|---|---|---|---|---|---|---|---|
| Main Power Supply (vehicle high-pwr sys) (e.g., Batt_0) | Power Supply 1 (Primary battery) (e.g., Batt_1) | Power Supply 2 (Secondary battery) (e.g., Batt_2) | Back-up (e.g., battery or super capacitor) | Isolate | SW_1 | SW_2 | SW_3 | SW_4 |
| ✓ | ✓ | ✓ | ✓ | N/A | ✓ | ✓ | ✓ | ✗ |
| ✓ | ✗ | ✓ | ✓ | Iso | ✗ | ✓ | ✓ | ✗ |
| ✓ | ✓ | ✗ | ✓ | Iso | ✓ | ✗ | ✓ | ✓ |
| ✓ | ✓ | ✓ | ✗ | N/A | ✓ | ✓ | ✗ | ✗ |
| ✓ | ✗ | ✗ | ✓ | Iso | ✗ | ✗ | ✗ | ✗ |
| ✓ | ✓ | ✗ | ✗ | Iso | ✗ | ✓ | ✗ | ✓ |
| ✓ | ✗ | ✓ | ✗ | Iso | ✗ | ✗ | ✗ | ✗ |
| ✗ | ✓ | ✓ | ✓ | Iso | ✓ | ✓ | ✗ | ✓ |
| ✗ | ✓ | ✓ | ✓ | Iso | ✓ | ✓ | ✓ | ✗ |
| ✗ | ✓ | ✗ | ✗ | Iso | ✗ | ✗ | ✓ | ✓ |
| ✗ | ✗ | ✓ | ✗ | Iso | ✓ | ✗ | ✗ | ✗ |
| ✗ | ✓ | ✗ | ✓ | Iso | ✓ | ✗ | ✗ | ✓ |
| ✗ | ✗ | ✓ | ✓ | Iso | ✗ | ✗ | ✗ | ✓ |
| ✗ | ✗ | ✗ | ✗ | Iso | ✗ | ✗ | ✗ | ✗ |
| ✗ | ✗ | ✗ | ✗ | Iso | ✗ | ✗ | ✗ | ✓ |

REDUNDANT POWER SUPPLIES FOR AN AUTONOMOUS DRIVING SYSTEM

TECHNICAL FIELD

Embodiments of the present disclosure relate generally to power systems. More particularly, embodiments of the disclosure relate to redundant power supplies for an autonomous/partially autonomous vehicle.

It shall be noted that the subject matter discussed in the background section should not be assumed to be prior art merely because of it being mentioned in this background section. Similarly, a problem mentioned in the background section or associated with the subject matter of the background section should not be assumed to have been previously recognized in the prior art. The subject matter in the background section merely represents different approaches, which in and of themselves may also be inventions.

BACKGROUND

Currently, some vehicles are equipped with the ability to operate in an autonomous mode (or nearly autonomous mode). Vehicles operating in an autonomous mode (e.g., driverless vehicle) can relieve the driver from at least some driving-related responsibilities. When operating in an autonomous mode, the vehicle can navigate to various locations using onboard sensors, allowing the vehicle to travel with minimal human interaction or in some cases without any passengers.

For electric vehicles, electrical power is fundamental because it is used to propel and control the vehicle. Regardless of whether a vehicle is electric, hybrid, or gasoline powered, power play crucial roles in autonomous vehicles (which should be understood to include nearly autonomous vehicles and vehicles operating with automated assistance) by providing electrical energy to various components and systems.

One of the most important system or systems are the onboard computers/processors/information handling systems, which are responsible for analyzing sensor data, making decisions, and controlling the vehicle. These computing systems, particularly those designed for autonomous driving (AD), comprise powerful processors (central processing units (CPUs), graphic processing units (GPUs), tensor processing units (TPUs), etc.) that demand a stable and continuous power input.

For the AD computing system to function properly, it also requires support from a number of auxiliary systems, each of which may also require a reliable power source. For example, autonomous vehicles rely heavily on a variety of sensors such as LIDAR (light/laser detection and ranging), radar, cameras, microphones, pressure sensors, temperature sensors, ultrasonic sensors that perceive the surrounding environment, etc. These sensors require a stable and continuous power supply to operate effectively.

Autonomous vehicles also utilize communication systems-both for intra-vehicle networks (such as communicating between different vehicle systems or components) and to communicate with external elements (such as other vehicles, infrastructure, telecommunications networks, etc.). For example, data communications are utilized for environmental controls (e.g., air conditioning and heating systems), onboard entertainment (e.g., streaming content), as well as telematics and navigation to obtain real-time information about the vehicle's location, traffic conditions, instructions, and software/firmware updates. For each of these communication modules, power is needed to transmit and receive data.

Autonomous vehicles also utilize electric actuators and/or motors for controlling various vehicle functions, including steering, acceleration, and braking. These components also rely on power supplies to function properly.

Thus, power for autonomous vehicles is fundamental for providing the energy needed to operate sensors, computing systems, communication modules, actuators, safety systems, entertainment features, and more. Reliable and efficient power management is essential to ensure the overall functionality and safety of autonomous vehicles.

Accordingly, what is needed are systems and methods that can provide control of redundant power supplies while operating in challenging environments, such as on vehicles that have limited resources.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 16 depicts different power source scenarios and corresponding actions for configuring the power supply and switches, according to embodiments of the present disclosure.

DETAILED DESCRIPTION

Figure 1:
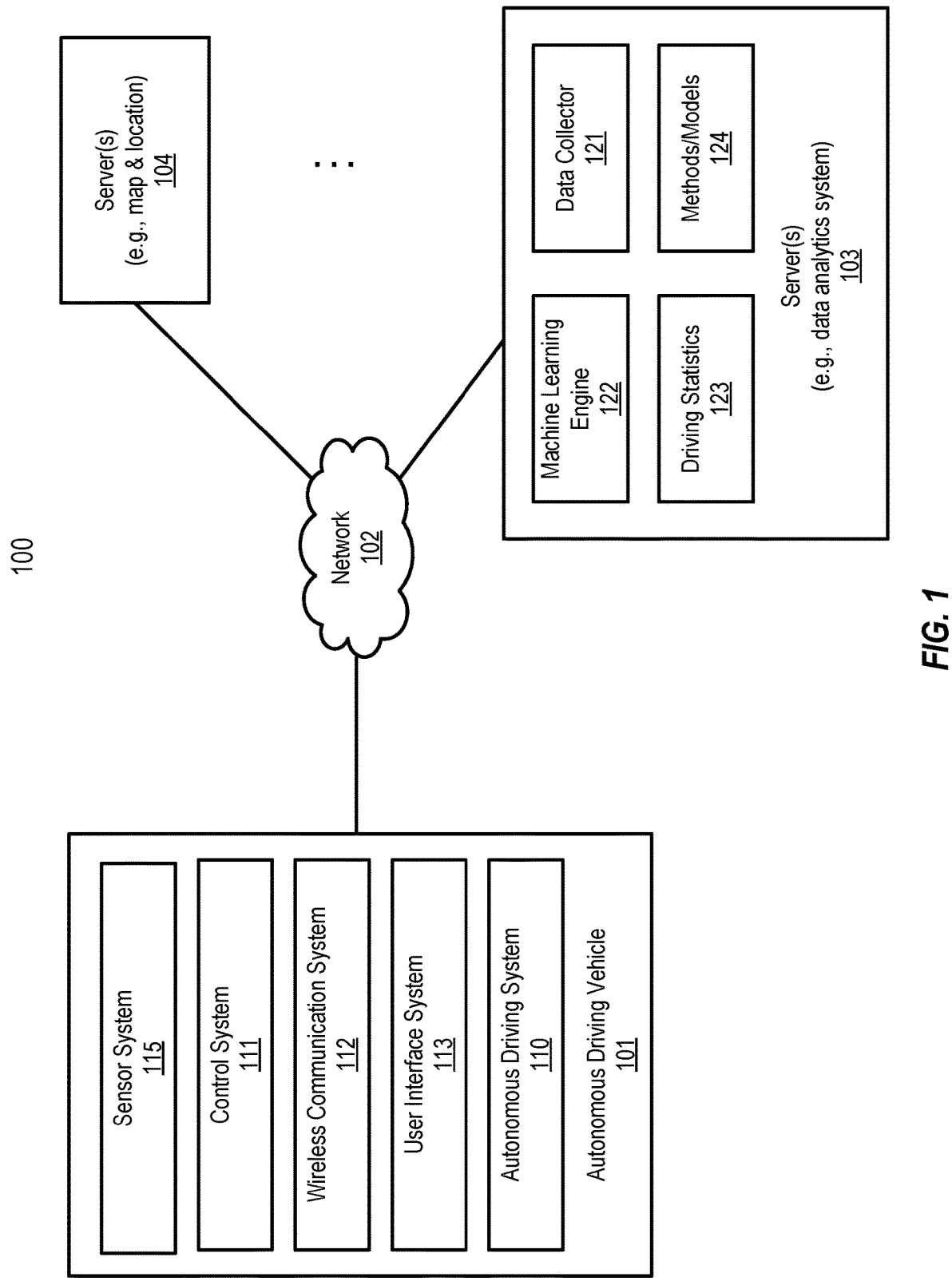
FIG. 1 is a block diagram illustrating a networked system, according to embodiments of the present disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures. Furthermore, one skilled in the art will recognize that embodiments of the present disclosure, described below, may be implemented in a variety of ways, such as a process, an apparatus, a system, a device, or a method on a tangible computer-readable/processor-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to a system component or components into which information may be entered or otherwise recorded. A set may contain any number of elements, including the empty set.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of autonomous driving (AD) computing systems, aspects of the present disclosure are not so limited. For example, the embodiments presented herein may be applied to systems that are not fully autonomous and may be applied in any application that requires reliable power. Accordingly, aspects of the present disclosure may be applied or adapted for use in other contexts.

A. General Overview

An autonomous vehicle can navigate to various locations using onboard sensors, thereby allowing the vehicle to travel with little or no human interaction. A critical aspect of any vehicle, whether fully autonomous or not, is its computation operations. Most modern vehicles utilize some level of computation functions (e.g., antilock braking, efficient fuel control, transmission operation, safety monitoring (e.g., monitoring key components), etc.). For a vehicle to be safe, it must be able to properly rely upon these computation functions.

Power is fundamental for autonomous systems and for these computational functions to receive data and execute the computations. Electricity/power provides the energy needed to operate sensors, computing systems, communication modules, actuators, safety systems, entertainment features, and more. Reliable and efficient power management is essential to ensure the overall functionality and safety of passengers of an autonomous vehicle and for people and property in the area of an operating vehicle.

Embodiments comprise multi-tiered distributed power supplies. In one or more embodiments, an overall power system may be structured into distinct levels for enhanced reliability and efficiency. Certain power systems may be tasked with supporting certain systems of the vehicle, which may be correlated to the amount of power (i.e., maximum power and duration) the tier can supply. Because of the inherent risks related to vehicles, a paramount emphasis of the power system design and operation is related to safety—both to passengers and to people and property within the vicinity of the vehicle. In one or more embodiments, a safety power supply is included as a backup system and may be accorded the utmost priority, thereby ensuring uninterrupted protection.

One skilled in the art shall recognize additional advantages that are not enumerated here for sake of brevity.

B. Embodiments of an Autonomous Driving Vehicle

FIG. 1 is a block diagram illustrating an autonomous driving network configuration according to one or more embodiments of the present disclosure. Referring to FIG. 1, network configuration 100 includes autonomous driving vehicle (ADV) 101 that may be communicatively coupled to one or more servers 103-104 over a network 102. Although one ADV is shown, multiple ADVs may be coupled to each other and/or coupled to servers 103-104 over network 102. Network 102 may be any type of network, such as a local area network (LAN), a wide area network (WAN) such as the Internet, a cellular network, a satellite network, an edge network, or a combination thereof, and may comprise wired, wireless, or both connectivity. Server(s) 103-104 may be any kind of information handling system or a cluster of information handling system, such as Web or cloud servers, application servers, backend servers, or a combination thereof. Servers 103-104 may be data analytics servers, content servers, traffic information servers, map and point of interest (MPOI) servers, location servers, etc.

An ADV refers to a vehicle that may be configured to operate in an autonomous mode in which the vehicle navigates through an environment with little or no input from a driver. Such an ADV may include a sensor system having one or more sensors that are configured to detect information about the environment in which the vehicle operates. The vehicle and its associated controller(s) may use the detected information to navigate through the environment. ADV 101 may operate in a manual mode, a fully autonomous mode, or a partially autonomous mode.

In one or more embodiments, ADV 101 includes, but is not limited to, an autonomous driving system (ADS) 110, vehicle control system 111, wireless communication system 112, user interface system 113, and sensor system 115. ADV 101 may further include certain common components included in ordinary vehicles, such as an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, wireless signals, or a combination thereof. For example, components 110-115 may be communicatively coupled to each other via a controller area network (CAN) bus or network connection. In one or more embodiments, a CAN bus is a vehicle bus standard designed to allow microcontrollers, devices, and applications to communicate with each other without a host computer; it is a message-based protocol, designed originally for multiplex electrical wiring within automobiles but may also be used in many other contexts.

Figure 2:
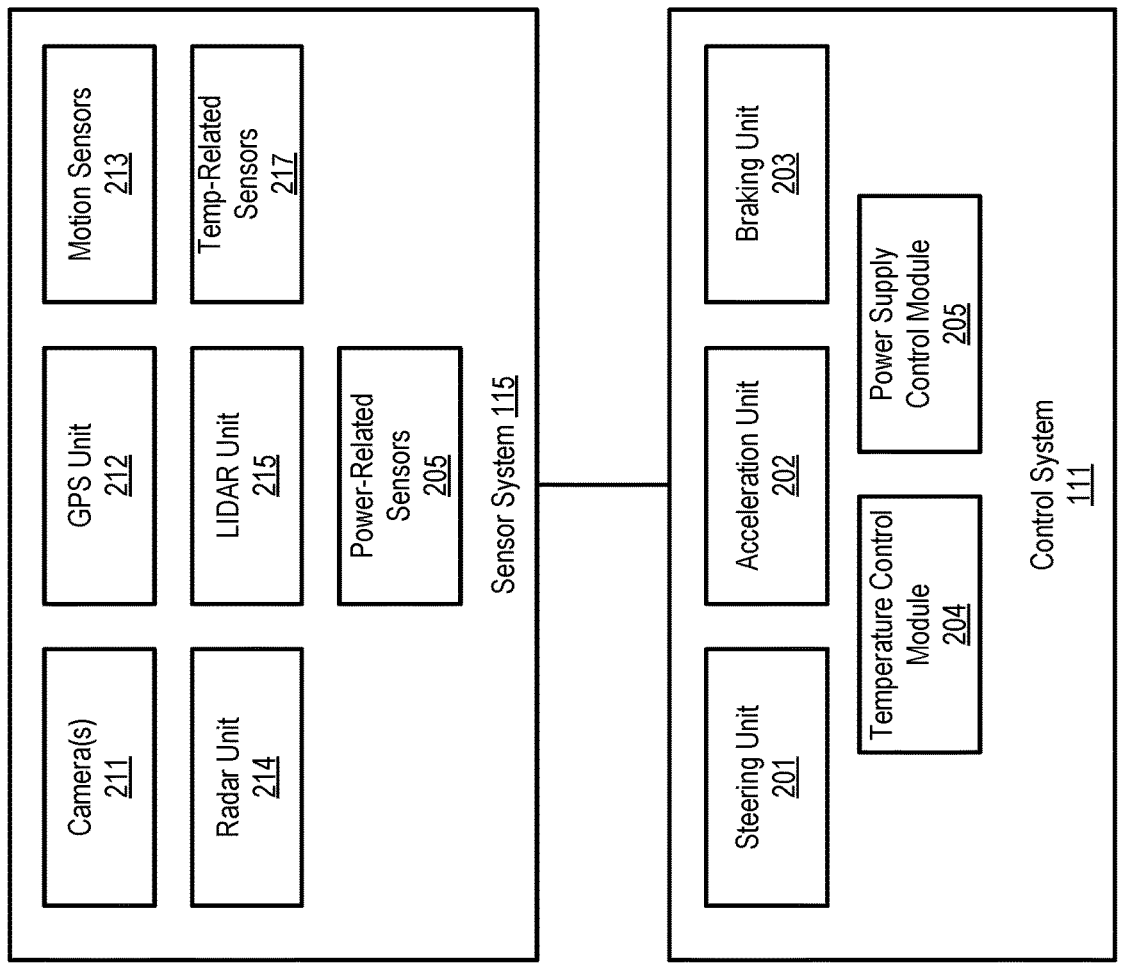
FIG. 2 is a block diagram illustrating an example of an autonomous driving vehicle system, according to embodiments of the present disclosure.

Referring now to FIG. 2, in one or more embodiments, the sensor system 115 includes, but is not limited to, one or more cameras 211, a global positioning system (GPS) unit or module 212, one or more motion sensors (e.g., inertial measurement unit (IMU), accelerometer, etc.) 213, radar unit 214, and a light detection and range (LIDAR) unit 215. GPS system 212 may include a transceiver operable to provide information regarding the position of the ADV. The motion sensor unit 213 may sense position and orientation changes of the ADV based on inertial acceleration. Radar unit 214 may represent a system that utilizes radio signals to sense objects within the local environment of the ADV. In one or more embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting platform.

Sensor system 115 may further include other sensors, such as a sonar sensor, an infrared sensor, a steering sensor, a throttle sensor, a braking sensor, an audio sensor (e.g., a microphone), and a weight or mass sensor. An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. In one or more embodiments, one or more sensors may be used to determine the mass or weight of the ADV, including its occupants and any other payload. In one or more embodiments, the mass/weight may be determined using one or more factors, such as torque (e.g., wheel torque need to accelerate, braking torque needed to accelerate or decelerate, etc.). Having one or more mass/weight sensors to gauge the overall weight of the ADV and its contents (including occupants) allows the ADV to use mass and/or weight parameters for one or more determinations, such as braking, accelerating, handling, etc.

In one or more embodiments, vehicle control system 111 includes, but is not limited to, steering unit 201, throttle unit 202 (also referred to as an acceleration unit), and braking unit 203 (also referred to as the braking system 203). Steering unit 201 may be used to adjust the direction or heading of the vehicle. Throttle unit 202 may be used to control the speed of the motor or engine which in turn controls the speed and acceleration of the vehicle. Braking unit 203 may be used to decelerate the vehicle by providing friction to slow the wheels or tires of the vehicle. The steering unit 201, the acceleration unit 202, and the braking system 203 may be coupled, in part, with the AD control or AD system (e.g., ADS 110 in FIG. 3A).

Sensor system 115 may further include one or more sensors 217 related to temperature or cooling systems. For example, the temperature-related sensor(s) 217 may include one or more temperature sensors (e.g., thermocouples, thermometers, etc.). It shall be noted that one or more other temperature-related sensors may be present, such as pressure sensors. In one or more embodiments, data from one or more temperature-related sensors may be supplied to temperature control module 204, which may comprise one or more control systems or interfaces for affecting cooling or heating systems for the ADV. For example, the temperature control module 204 may monitor the temperature of a computing system on which the ADV systems (e.g., ADV 101) operates. As noted previously, maintaining the computing system within a certain operating temperature range can be important for the computing system to properly and timely operate. Also, since the vehicle may be fully autonomous, it is imperative that its computing abilities not be inhibited, take too long to process, or make erroneous calculations. Furthermore, keeping the computing system within a certain operational temperature range helps prolong the life of the computing components.

Sensor system 115 may further include one or more sensors 215 related to power. For example, the power-related sensors 215 may include one or more battery monitors sensors—although it shall be noted that various types of power-related sensors intended to measure and monitor different aspects of electrical power systems may be used. Such power-related sensors may include, but are not limited to: voltage sensors, current sensors, power meters, power quality analyzers, residual current devices (RCD) (which detect and measure imbalances in current), voltage sag detectors (which monitor and detect short-term decreases in voltage), load sensors, and surge detectors.

Note that one or more of the components shown in FIG. 2 may be implemented in hardware, software, or a combination thereof.

Returning to FIG. 1, wireless communication system 112 is to allow communication between ADV 101 and external systems, such as devices, sensors, other vehicles, etc. For example, wireless communication system 112 may wirelessly communicate with one or more devices directly or via a communication network, such as servers 103-104 over network 102. Wireless communication system 112 may use any cellular communication network or a wireless local area network (WLAN), e.g., using WiFi to communicate with another component or system. Wireless communication system 112 may communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode, but may also provide functionality when operating in a manual mode or in a hybrid/assisted mode. ADS 110 includes hardware (e.g., processor(s), memory, storage, etc.) and software (e.g., operating system, planning and routing programs, etc.) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

A user as a passenger may specify a starting location and a destination of a trip, for example, via a user interface. ADS 110 obtains the trip-related data. For example, ADS 110 may obtain location and route data from an MPOI server, which may be a part of servers 103-104. The location server provides location services and the MPOI server provides map services and the POIs (points of interests) of certain locations. Additionally, or alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third-party entity. Additionally, or alternatively, the functionalities of servers 103-104 may be integrated with ADS 110. Based on the real-time traffic information, MPOI information, and location information, as well as real-time local environment data detected or sensed by the sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one or more embodiments, a data analytics system 103 includes a data collector 121 and a machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

In one or more embodiments, based on driving statistics 123, machine learning engine 122 generates or trains a set of rules, algorithms (methods), and/or predictive models 124 for a variety of purposes. For example, in one or more embodiments, methods/models 124 may include one or more algorithms or models to receive data from a plurality of sensors mounted on the ADV related to the ADV being held at or brought to a standstill, one or more methods for detecting a status of the ADV including a rolling speed of the ADV based on the data from the plurality of sensors, one or more methods to activate or deactivate one or more of the braking units (e.g., a primary brake and/or a secondary brake) in response to detecting the status of the ADV being at a particular status, which may be based upon one or more predetermined speed threshold ranges. Methods/models 124 may be uploaded on ADVs to be utilized during autonomous driving in real time.

Figure 3A:
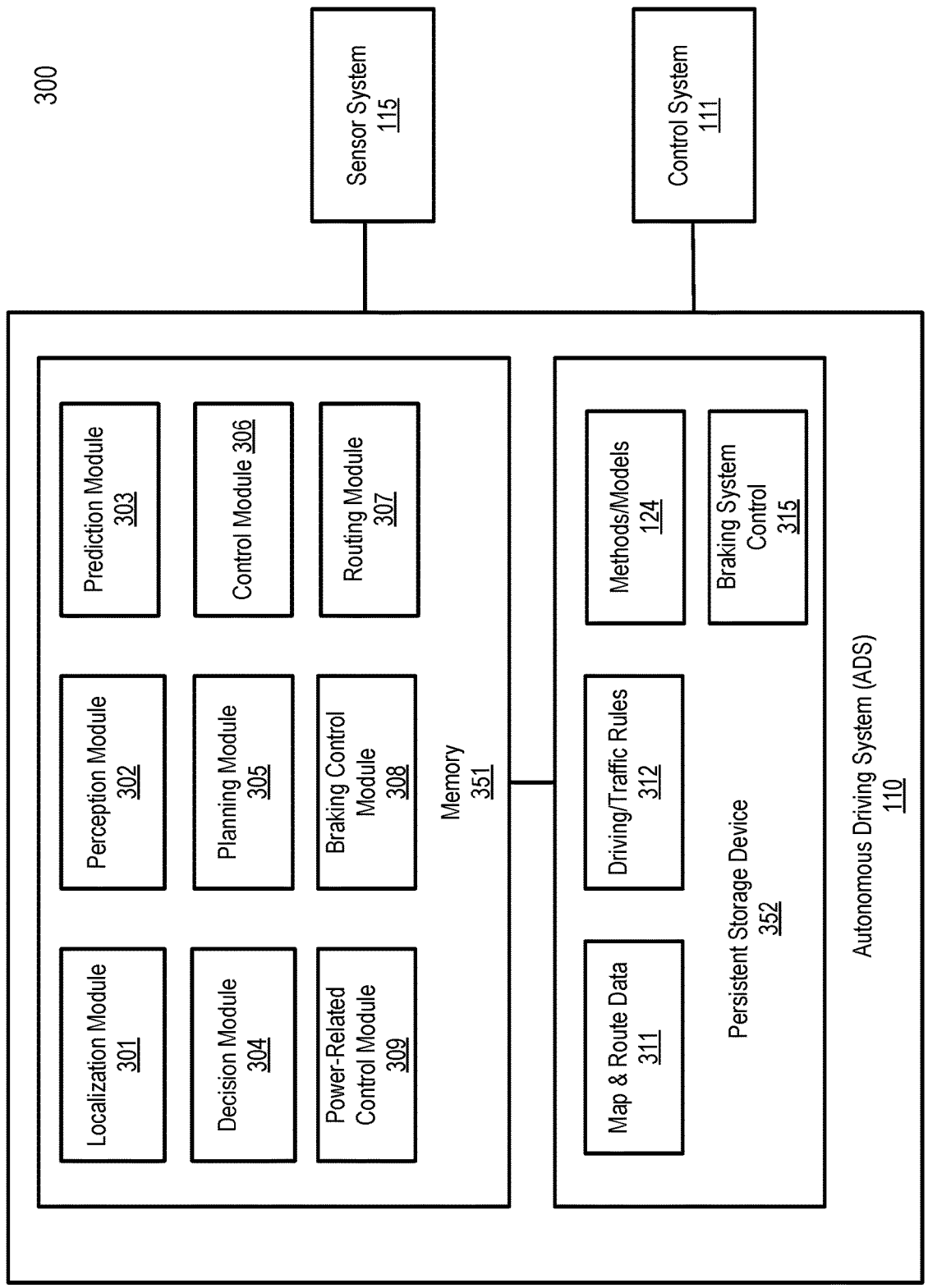
FIGS. 3A & 3B are block diagrams illustrating an example of an autonomous driving system used with an autonomous driving vehicle, according to embodiments of the present disclosure.
Figure 3B:
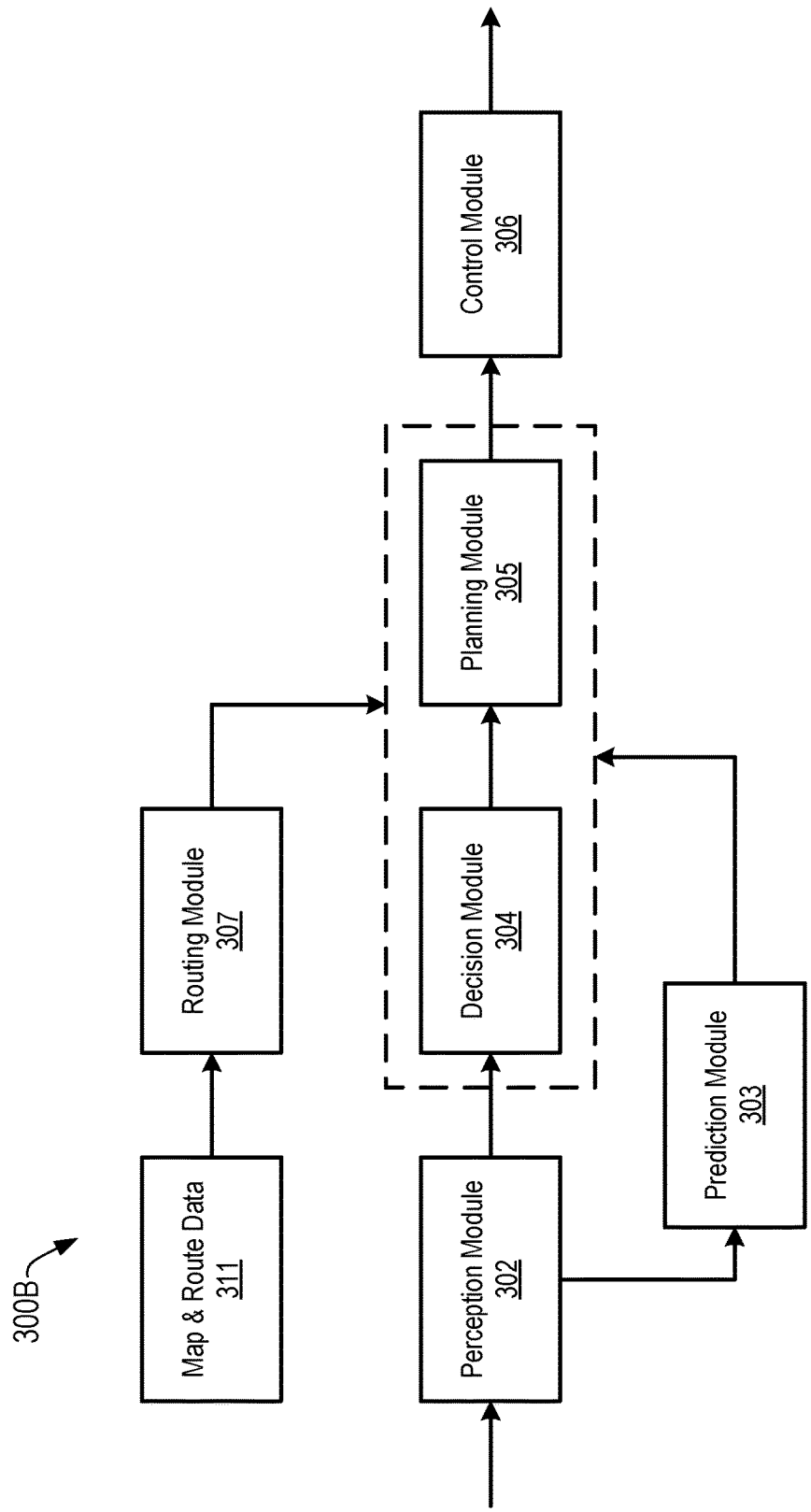

FIGS. 3A and 3B are block diagrams illustrating an example of an autonomous driving system used with an ADV, according to embodiments of the present disclosure. System 300 may be implemented as a part of ADV 101 of FIG. 1 including, but is not limited to, ADS 110, control system 111, and sensor system 115. Referring to FIGS. 3A and 3B, ADS 110 includes, but is not limited to, localization module 301, perception module 302, prediction module 303, the decision module 304, planning module 305, control module 306, routing module 307, braking system control module 308, and power-related control module 309. It shall be noted that additional modules, while not depicted may be present, such as temperature control. Referring to FIG. 3B, planning module 305, control module 306, and/or other modules may perform the computations, determinations, and steps required to instruct the operation of systems of the vehicle.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 may determine a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as a map and route data 311, to obtain the trip-related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception may include the lane configuration, traffic light signals, a relative position of another vehicle, a pedestrian, a building, a crosswalk, or other traffic-related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras to identify objects and/or features in the environment of the ADV. The objects may include traffic signals, roadway boundaries, other vehicles, pedestrians, and/or obstacles, etc. The computer vision system may use object recognition methods, video tracking, and other computer vision techniques. In one or more embodiments, the computer vision system maps an environment, tracks objects, and estimates the speed of objects, etc. Perception module 302 may also detect objects based on other sensor data provided by other sensors such as a radar and/or LIDAR.

For each of the objects, prediction module 303 predicts how the object will behave under the circumstances. The prediction may be performed based on the perception data perceiving the driving environment at the point in time given a set of map/route information 311, traffic rules 312, and/or braking system control parameters 315. For example, if the object is a vehicle in an opposing direction and the current driving environment includes an intersection, prediction module 303 may predict whether the vehicle is likely to move straight forward or make a turn. If the perception data indicates that the intersection has no traffic light, prediction module 303 may predict that the vehicle may have to fully stop before entering the intersection. If the perception data indicates that the vehicle is currently at a left-turn-only lane or a right-turn-only lane, prediction module 303 may predict that the vehicle is more likely to make a left turn or right turn, respectively.

The prediction module 303 may calculate a rate of deceleration or stop distance based on the braking system control parameters 315 to determine a safe zone for driving at a desired speed. For example, some obstacles/vehicles, road conditions, and/or safety conditions (e.g., open door) may cause the prediction module 303 to steer or decelerate to maintain safety. The braking control parameters 315 may include recorded deceleration data indicating an upper limit and/or environment-correlated deceleration rates. In one or more embodiments, the braking system control parameters 315 may be used by one or more braking systems (e.g., PBS, SBS, electric parking brake (EPB), etc.).

For each of the objects, decision module 304 may make a decision regarding how to handle the object. For example, for a particular object (e.g., another vehicle in a crossing route) as well as its metadata describing the object (e.g., a speed, direction, turning angle, etc.), decision module 304 may decide how to encounter the object (e.g., overtake, yield, stop, pass, etc.). Decision module 304 may make such decisions according to a set of rules, such as traffic rules or driving rules 312, which may be stored in persistent storage device 352.

In one or more embodiments, routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in the form of a topographic map for each of the routes it determines from the starting location to reach the destination location. A reference line refers to an ideal route or path without any interference from others such as other vehicles, obstacles, or traffic conditions. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 depending upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, the decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. In one or more embodiments, the planning and control data include sufficient information to drive the vehicle from a first point to a second point of a route or path using appropriate vehicle settings or driving parameters (e.g., throttle, braking, steering commands, etc.) at different points in time along the path or route.

In one or more embodiments, the planning phase is performed in a number of planning cycles, also referred to as driving cycles, such as, for example, in every time interval of 100 milliseconds (ms). For each of the planning cycles or driving cycles, one or more control commands may be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one or more embodiments, planning module 305 plans a route segment or path segment for the next predetermined period of time such as 5 seconds. For each planning cycle, planning module 305 plans a target position for the current cycle (e.g., the next 5 seconds) based on a target position planned in a previous cycle. Control module 306 may then generate one or more control commands (e.g., throttle, brake, steering control commands, etc.) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect the movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system may incorporate data from a GPS system and one or more maps to determine the driving path for the ADV.

While not depicted in FIG. 3A, a temperature control module may receive one or more measurements related to temperature for controlling systems that operate within certain temperature ranges. In one or more embodiments, the temperature-related control module may receive temperature readings of the computing system of the ADV. To keep the computing system within an operational temperature range, the temperature-related control module may control a cooling system.

Also depicted in FIG. 3A is a power-related control module 309 that may receive one or more measurements related to power (e.g., generator, batteries, solar, etc.) for systems. In one or more embodiments, the power-related control module 309 may receive power-related readings from various power sources and at various junctions. To keep the computing systems operational, the power-related control module 309 may control which source(s) provides power (e.g., main power, primary backup, secondary backup, tertiary backup, etc.) and which components or systems receive power. Embodiments are disclosed in more detail below.

Figure 4:
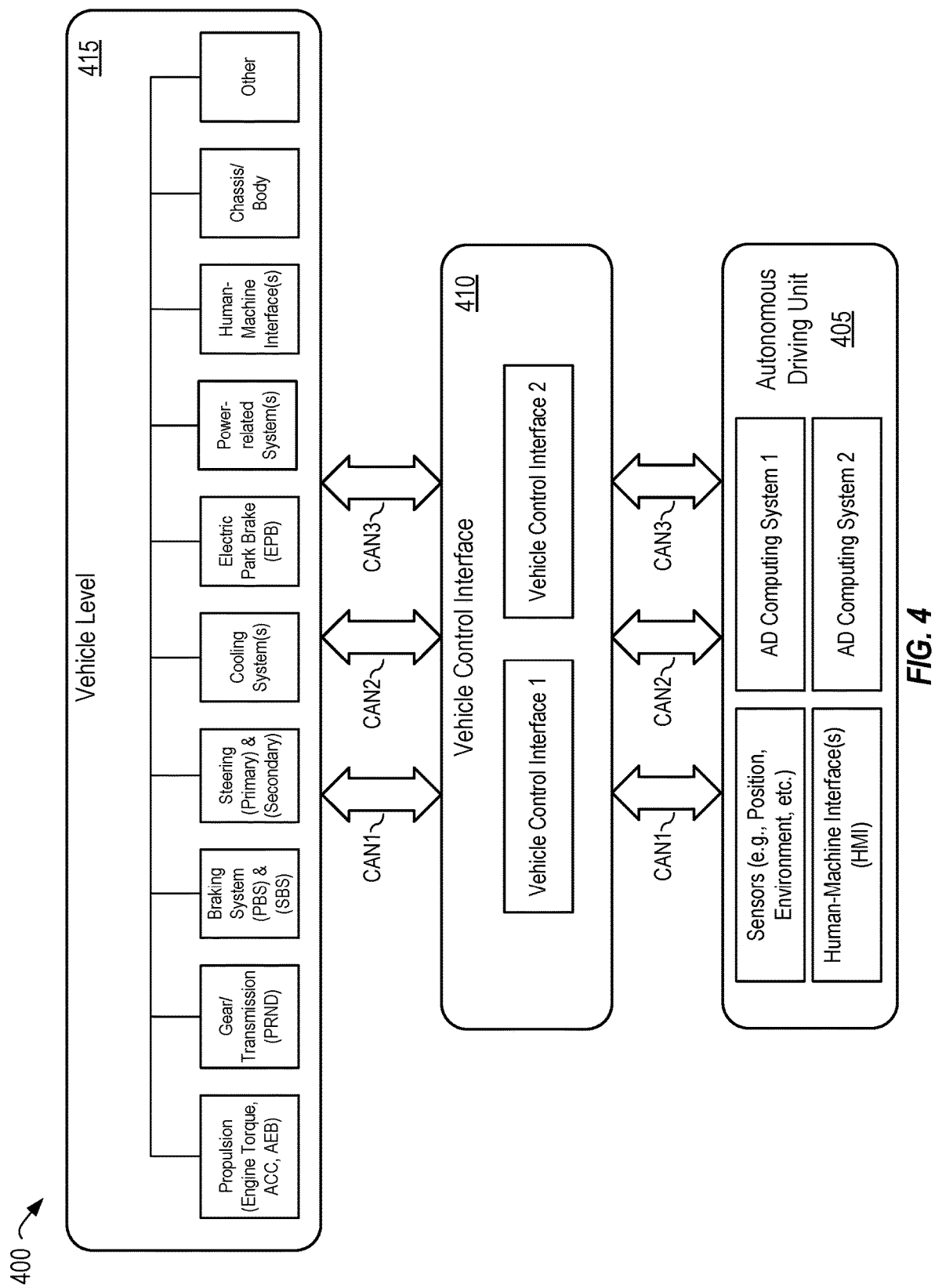
FIG. 4 is a block diagram of an example control system, in accordance with aspects of the present disclosure.

FIG. 4 is a block diagram 400 of an example control system, in accordance with aspects of the present disclosure. As shown, the example control system may include three high-level components: the autonomous driving unit 405, the vehicle control interface 410, and the vehicle level components 415.

The autonomous driving unit 405 may include various sensors (e.g., cameras, microphones, LIDAR, GPS, accelerometers, door sensors, light sensors, proximity sensors, thermal sensors, tilt sensors, hydraulic pressure sensors, brake caliper sensors, power-related sensors, etc.). The autonomous driving unit may include one or more autonomous driving computer systems for computing control inputs to the vehicle-level components (e.g., engine, braking system, steering, etc.).

The vehicle control interface 410 allows the sensor information to be provided to the various vehicle-level components 415. For example, a command/output from the AD computer system may be used to actuate two or more components (e.g., steering, brake, cooling, etc.) at the vehicle level. According to aspects of the present disclosure, power control may be implemented using sensors, the power-related system(s), and one or more computing systems.

In one or more embodiments, the vehicle-level elements may include propulsion-related components (or elements), gear/transmission-related components, steering, braking, interfacing, chassis/body, cooling system(s), and other elements (e.g., tire pressure sensors and controls). While these vehicle-level components are depicted as being connected or communicatively connected via a single connection, there may be one or more redundant connections; there may also be differently configured connections (i.e., certain components may be on different connection segments than other components). The vehicle-level components may include various sensors for providing feedback to the respective operations.

In one or more embodiments, the vehicle-level system may include cooling systems for maintaining one or more components (e.g., engine, computing system, etc.) within an operational temperature range for the respective component. Different cooling systems may be used for different components. For example, if the vehicle includes an engine that requires cooling, the cooling system for the engine may be separate from a cooling system for the computing system. In one or more embodiments, one or more elements of the cooling system may be used in common between cooling systems.

Figure 5:
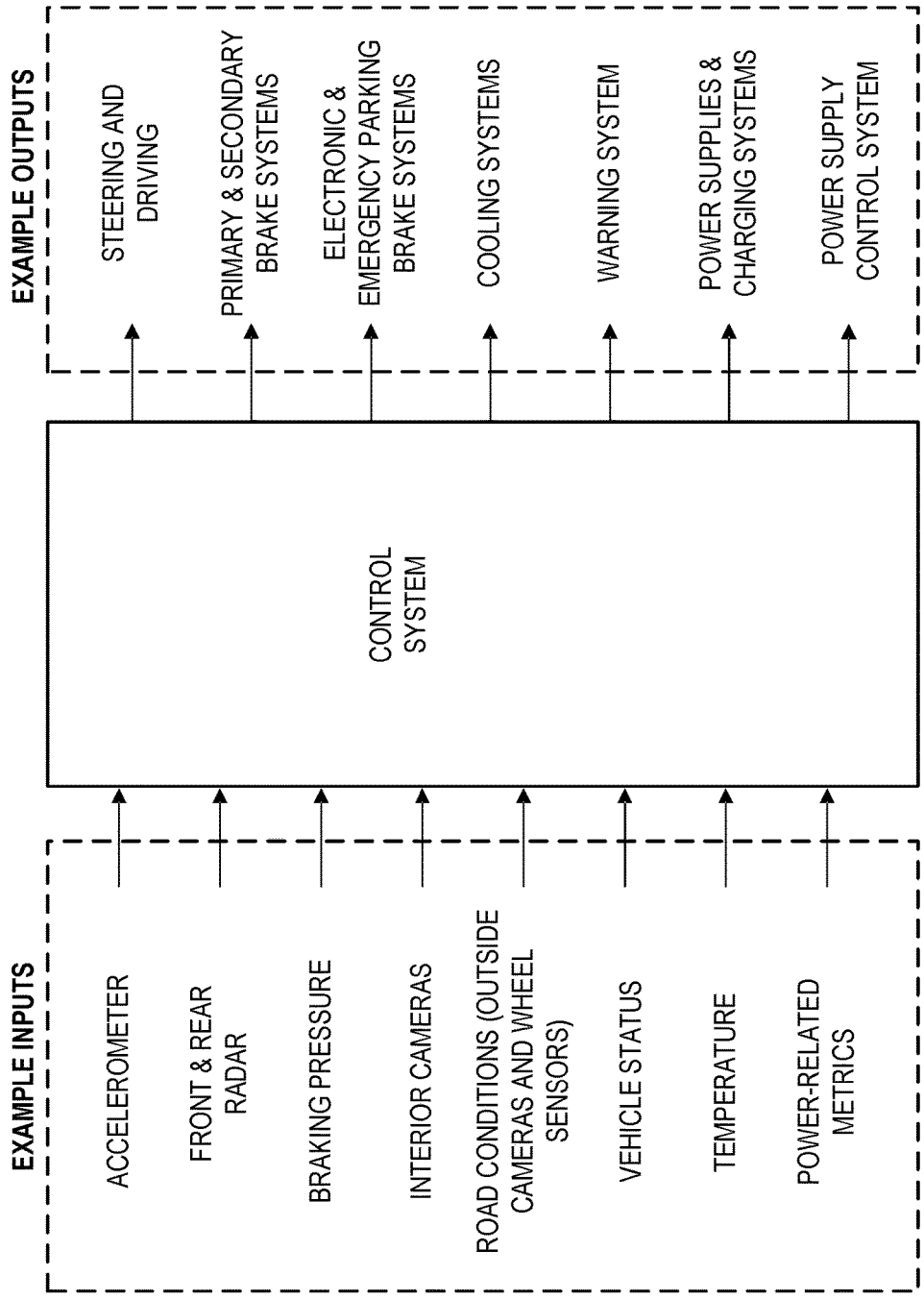
FIG. 5 depicts a diagram of an example control system and associated inputs and outputs, according to embodiments of the present disclosure.

FIG. 5 depicts a diagram 500 of an example control system and associated inputs and outputs, according to embodiments of the present disclosure. As shown, the control system may use various measurements or sensor feedback as input. The example inputs may include information (e.g., speed) from one or more accelerometers, braking pressure valves, hydraulic pressure, brake caliper valves, radar (or LIDAR) information of the front and rear of the ADV, imaging information from interior cameras, road conditions captured by exterior cameras and/or wheel sensors, door sensors, vehicle status (e.g., speed, operation conditions of various systems, such as whether one or more of the braking systems are operating properly, etc.), temperature, and pressure of coolant system, and power-related metrics. While not depicted, in one or more embodiments, the control system may receive one or more failure messages related to conditions of a critical component, such as the power systems and computing systems.

Upon determining a status based upon one or more sensor inputs or messages, the control system may provide various outputs to various systems of the ADV. For example, outputs may include control signals to control power source(s) to one or more computing systems, vehicle control, and alerts and warning systems, among others, for handling power control for the ADV, as disclosed in the current patent document.

In one or more embodiments, one or more wheel sensors may be used to detect speed of the ADV. The wheel sensors may generate magnetic pulses in the form of waves, proportional to the speed of the ADV. For example, one or more of the ADV's wheel sensors, which may be located at each of the wheels (i.e., front left (FL), front right (FR), rear left (RL), rear right (RR) wheel), may be used to detect the speed of the ADV based on pulses detected. In one or more embodiments, when at least two diagonal wheel sensors (e.g., FL & RR or FR & RL) detect pulses within a set time period, the control system may register a status or state of the ADV. The ADV may be in different states based on the speed of the ADV, and different control techniques may be applied accordingly.

Different actions may be activated or triggered based on different states of the ADV. It shall also be noted that one or more different conditions may be monitored and/or may be combined to form a detected state.

In one or more embodiments, the control system may receive power/battery monitoring information related to one or more power systems and may take action to control the powering of components in the vehicle and for executing one or more actions.

Note that at least some of the components described above may be implemented in software, hardware, or a combination thereof. For example, such components can be implemented as software installed and stored in a persistent storage device, which can be loaded and executed in memory by a processor (not shown) to carry out the processes or operations described throughout this application. Alternatively, such components can be implemented as executable code programmed or embedded into dedicated hardware such as an integrated circuit (e.g., an application-specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the detailed descriptions presented herein are presented in terms of methods and symbolic representations of operations on data bits within a computer memory. These descriptions and representations are the ways used by those skilled in the data processing arts to most effectively convey the substance of their work to others skilled in the art. A method may, generally, be conceived to be a self-consistent sequence of operations leading to a desired result or results; the operations may be considered to be those requiring physical manipulations of physical quantities.

It should be borne in mind, however, that these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

C. Embodiments Regarding Redundant Power Supplies

As noted above, power for autonomous vehicles is fundamental for providing the energy needed to operate sensors, computing systems, communication modules, actuators, safety systems, entertainment features, and more. Reliable and efficient power management is essential to ensure the overall functionality and safety of passengers of an autonomous vehicle and for people and property in the area of an operating vehicle.

Previously, a single secondary battery was used in conjunction with an autonomous driving (AD) system. Such implementations had the benefit of being simply, with fewer degrees of freedom, which required fewer controls, and was efficient. However, the simplicity also resulted in significant issues. First, it was less safe. If both power systems failed, it could result in catastrophic events. Second, it was less robust. If a power system failed, the vehicle needed to be stopped immediately because a failure of the second power supply was catastrophic as noted in the prior point. A single backup system meant that there was no ability to have a hierarchical structure or structures that could afford different options to address power supply issues. Accordingly, presented herein are embodiments for redundant power supplies for an autonomous vehicle.

Embodiments comprise multi-tiered distributed power supplies. For example, the overall power system may comprise multiple tiers of power supplies (e.g., 3 or 4 tiers of power supplies). In one or more embodiments, the overall power system may be structured into distinct levels for enhanced reliability and efficiency. Certain of the power systems may be tasked with supporting certain systems of the vehicle, which may be correlated to the amount of power (i.e., maximum power and duration) the tier can supply. Because of the inherent risks related to vehicles, a paramount emphasis of the power system design and operation is related to safety—both to passengers and to people and property within the vicinity of the vehicle. In one or more embodiments, a safety power supply is included as a backup system and may be accorded the utmost priority, thereby ensuring uninterrupted protection.

Embodiments allow for dynamic control over all power sources, thereby facilitating real-time adjustments as needed. For example, responsive to detecting an issue with a power supply, controls can switch not only sources of power but also flows of the power to (or not to) certain components of the vehicle. Vehicle control mechanisms are capable of adapting to the current power supply conditions, which can optimize performance and safety.

Furthermore, in one or more embodiments, one or more warning systems, which may be purpose-built, are activated in response to changes in the power supply status, thereby enhancing overall safety and awareness.

1. Embodiments of a Power Supply Systems

Figure 6:
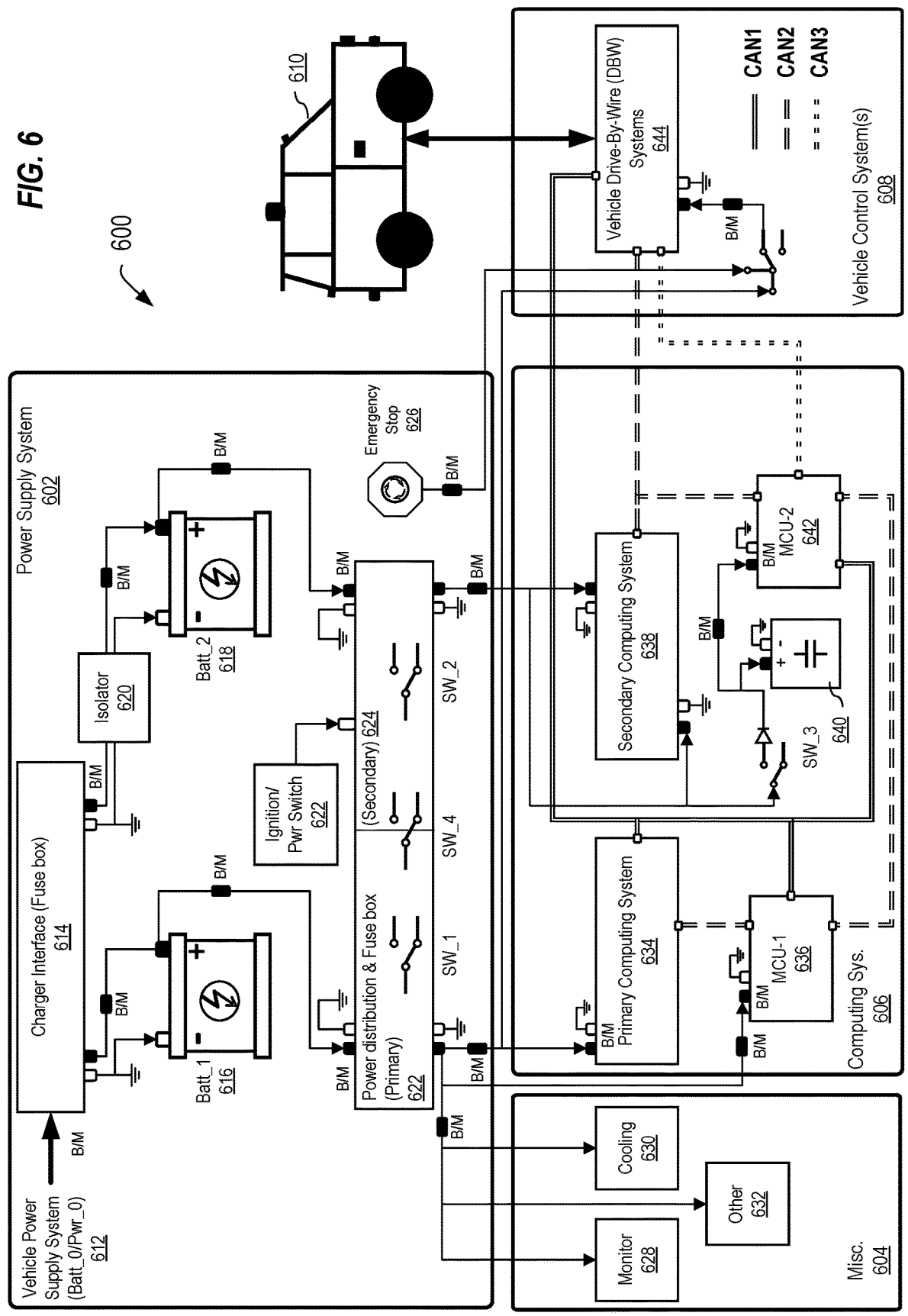
FIG. 6 depicts a redundant power supply system, according to embodiments of the present disclosure.

FIG. 6 depicts a redundant power supply system, according to embodiments of the present disclosure. For purposes of illustration, in the depicted embodiment, there are four main systems: a power supply system 602, computing system 606, vehicle control system 608, and miscellaneous systems 604.

a) Power Supply System Embodiments

Power supply system 602 may receive power from the main vehicle power supply system 612. Depending upon the implementation, the power supply system may be a battery (which should be understood to mean a single battery or a set of two or more batteries), power from an alternator, or some combination thereof. Power from this source may be received by a charger interface 614, which may be coupled to a primary 616 battery (i.e., batt-1) and a secondary battery 618 (i.e., batt-2). In one or more embodiments, the charger interface 614 may be used to keep other power supplies charged (e.g., primary battery 616, secondary battery 618, and tertiary power source 640) and may comprise additional components such as fuses, rectifiers, power or battery monitors (b/m). In one or more embodiments, the main power source 612 may supply power via the primary battery 616.

One design concept of embodiments is that there are tiers of power supply and that a safety power supply may be of the highest priority. In one or more embodiments, a primary power supply's function is for full function use. That is, in addition to the main power, the primary power supply can supply sufficient power (e.g., >1200 w) for the vehicle to fully function. In one or more embodiments, if the main power supply has issues, the primary supply may first be separated from the main power supply. The power supply may be configured to provide enough power to all systems, including the vehicle drive-by-wire (DBW) system, which may be determined by calculating power consumption of all devices. However, in one or more embodiments, the primary backup power supply 616 may have limited power and may also supply fewer components.

In one or more embodiments, a secondary power supply may be able to fully supply power; but alternatively, it may supply power to fewer components and thus may supply less power (e.g., <300 w). The secondary (and subsequent tiered power supplies) may be less powerful due to several reasons including costs, size, weight, etc. As a result, they may not be able to supply power to all components and may only be able to supply power for a limited duration. In one or more embodiments, if vehicle power and the primary power supply have issues, they may be isolated and utilize the secondary power system.

In one or more embodiments, a tertiary or backup power supply, which may be a super capacitor, battery, or combination thereof, may be used for a last line of defense. If the main vehicle power, primary power, and secondary power systems have failed, a controller (e.g., MCU-2) may operate using the tertiary power source to provide safe shutdown.

Depicted in the embodiment shown in FIG. 6 is an isolator 620 positioned between the charger interface 614 and the secondary battery 618. The isolator 620 may be used to electrically isolate the secondary battery from other parts of the charger system. For example, if the vehicle power supply and the primary battery both fail, it is beneficial to electrically isolate the secondary battery from both of these systems so that power is not drained from the secondary battery to either of these systems. By electrically isolating the secondary battery, all of its power can be ensured to be used for powering components that assist in operating the vehicle (e.g., a computing system and/or microcontroller unit (MCU)).

While not depicted, one or more additional isolators may be utilized for electrically isolating different systems and/or components.

In the depicted embodiments, the power system 602 also comprises a primary distribution 622 component and a secondary distribution 624 component. Like with the charger interface, the primary distribution system 622, the secondary distribution system 624, or both may comprise additional components such as fuses, rectifiers, power or battery monitors (b/m), etc.

In one or more embodiments, part of the dynamics of embodiments is provided via a plurality of switches (e.g., SW_1, SW_2, SW_3, and SW_4). The switches allow for different flows of power (e.g., from different sources and/or to different system components) as well as providing electrical isolation between systems and/or components. In one or more embodiments, the switches settings may be configured as follows:

SW_1:
ON=the primary distribution 622 provides power to:
  i. primary computing system 634;
  ii. MCU-1 636;
  iii. Misc. 604;
  iv. vehicle primary drive-by-wire system 644; and
  v. primary sensors.
  vi. Note that, in one or more embodiments, in the event of low voltage in a redundancy power supply system or unexpected issues leading to a temporary inability to provide sufficient current, SW_4 may be activated to sequentially transfer power to secondary computing system 638 and then to MCU-2 640.
OFF=electrically isolates the primary distribution 622 from:
  i. the primary computing system 634;
  ii. MCU-1 636;
  iii. Misc. 604;
  iv. vehicle primary drive-by-wire system 644; and
  V. primary sensors.
SW_2:
ON=the secondary distribution 624 provides power to:
  i. secondary computing system 638;
  ii. MCU-2 642;
  iii. vehicle secondary drive-by-wire system (not depicted or could be incorporated into 644); and
  iv. secondary sensors.
OFF=electrically isolates the secondary distribution 624 from:
  i. secondary computing system 638;
  ii. MCU-2 642;
  iii. vehicle secondary drive-by-wire system; and
  iv. secondary sensors.
SW_3:
ON=secondary distribution 624 provides power to:
  i. super capacitor 640;
  ii. MCU-2 642; and
  iii. in one or more embodiments, one or more emergency sensors (e.g., a low power camera and a radar).
OFF=electrically isolates the secondary distribution 624 from:
  i. super capacitor 640;
  ii. MCU-2 642; and
  iii. in one or more embodiments, one or more emergency sensors (e.g., a low power camera and a radar).

SW_4:
ON=provides power from the primary distribution 622 to the secondary distribution 624; and
OFF=electrically isolates the primary distribution 622 from the secondary distribution 624.

It shall be noted that the power supply system may include or be associated with additional components. For example, a vehicle ignition/power switch 622 for turning on the vehicle may also be linked to the power supply system 602. The vehicle ignition/power switch 622 may have different settings that provide power to different portions of the vehicle (e.g., an accessory setting and a full run setting). In one or more embodiments, an emergency stop switch or button 626 may also be integrated into the system. One skilled in the art shall recognize that some elements may be removed and/or that additional elements may be included.

b) Computing System & Controller System Embodiments

In one or more embodiments, a computing system 606 may comprise a plurality of computing components. In the embodiment depicted in FIG. 6, the computing system 606 comprises a primary computing system 634, a secondary computing system 638, a first microcontroller unit (MCU) 636, and a second MCU 642.

In one or more embodiments, the primary 634 and secondary computing system 638 may be capable of performing the same functions. In alternative embodiments, the primary computing system 634 may be configured to fully support all functions of the vehicle, while secondary computing system 638 may be configured to perform a reduced set of functionalities. In yet other alternative embodiments, the primary computing system 634 may be configured to support a first reduced set of functions, while secondary computing system 638 may be configured to support a second reduced set of functions. The computing systems may perform any or all of the functions discussed above related to autonomous driving (e.g., FIGS. 1-5 and the associated text), including operating as the autonomous driving system 110.

In one or more embodiments, MCU-1 636 monitors the primary computing system 634, while MCU-2 642 monitors the secondary computing system 634. Additionally, or alternatively, the MCUs may act as redundancy for each other.

In one or more embodiments, MCU-1 636 oversees the status of the primary computing system 634 by monitoring various parameters, such as CPU processing frequency, temperatures, speed, etc. It may also monitor core frequency, heartbeat, and the status of one or more communication buses (e.g., Ethernet, CAN buses, I2C, etc.). Additionally, MCU-1 may monitor the power supply systems for both the primary computing system and itself, as well as the status of sensors connected to the primary computing system.

In one or more embodiments, MCU-2 642 may actively monitor the status of the secondary computing system 638, encompassing parameters such as CPU processing frequency, temperatures, speed, etc. It may also oversee core frequency, heartbeat, and the status of one or more communication buses (Ethernet, CAN buses, I2C, etc.). Furthermore, MCU-2 may be responsible for monitoring the power supply systems for both the secondary computing system and itself, as well as the status of sensors connected to the secondary computing system.

In one or more embodiments, both MCU-1 636 and MCU-2 642 monitor the CAN buses and communication system(s) of the whole AD system. In cases of any unnormal event happening, one or both may broadcast the diagnostic results to other MCU and DBW system(s) accordingly.

In one or more embodiments, one or more of the MCUs may also perform operations related to control of the vehicle. For example, given a failure of the main power supply, the primary power source, and the secondary power source, MCU-2 642 may be powered by the tertiary power supply 640. Due to its 640 limited power, the MCU-2 642 may be configured to perform limited operations related to a safe shutdown of the vehicle by providing instructions/controls to the vehicle drive-by-wire (DWB) system 644.

In one or more embodiments, a computing system and/or MCU may also cause one or more alerts to be generated. The alerts may be used to trigger one or more warning signals or warning/failure signals to a user, passenger, repairman, roadside assistance, and/or remote user. Such warnings may comprise one or more media types (e.g., lights, sounds, messages, etc.). For example, a message may include a light signal, a text message, an audible signal, a tactile signal, a network message, an application message, an email, or any combination thereof. In one or more embodiments, the alert(s) may be different based on different detected failures. An alert may also trigger or be performed in conjunction with one or more actions, such as a safety or emergency shutdown procedure (e.g., slow vehicle, find location to park, park vehicle, shutdown computing system).

c) Vehicle Control System Embodiments

As depicted in FIG. 6, the system 600 comprises a vehicle control system 608. In one or more embodiments, the vehicle control system 608 may comprise a vehicle drive-by-wire (DWB) system 644, although other implementations may also be used. The vehicle DBW system 644 receives instructions from a control/computing system, which may be the primary computing system 634, the secondary computing system 638, the first MCU 636, and/or the second MCU 642. The instructions may be communicated by one or more communication pathways. For example, the vehicle DBW system 644 may be communicatively coupled or connected to the various controller/computing systems via one or more CAN buses, such as CAN1, CAN2, and CAN3 as shown in FIG. 6. The different communication channels provide added redundancy to the vehicle system.

In one or more embodiments, the switch in the vehicle control system(s) 608 may enable the activation and deactivation of the drive-by-wire (DBW) power supply in response to external emergency signals.

Figure 7:
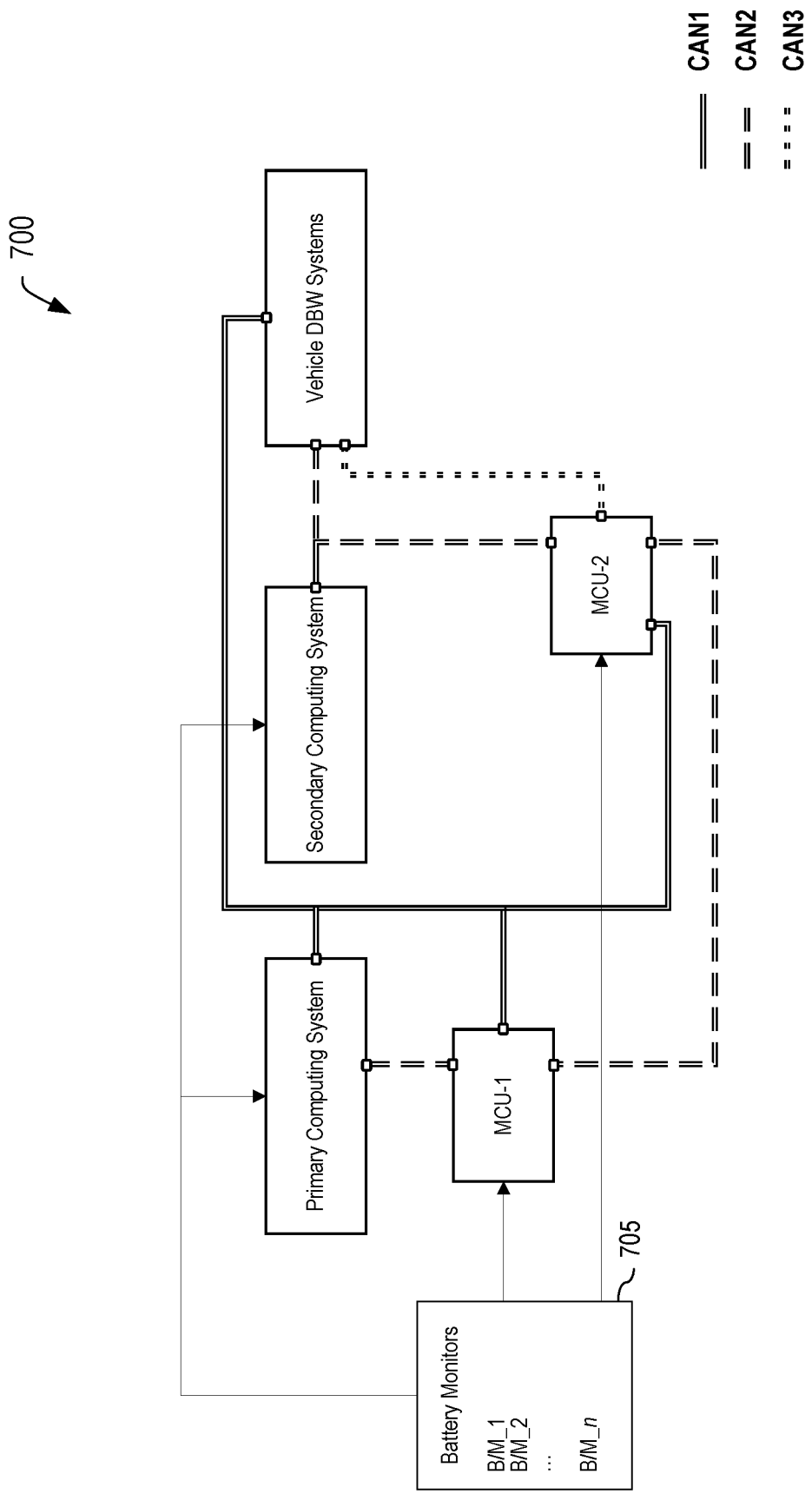
FIG. 7 depicts an alternative view of the communication pathways, according to embodiments of the present disclosure.

FIG. 7 depicts an alternative view 700 of the communication pathways, according to embodiments of the present disclosure. Also depicted is the connection to a set of battery monitors 705, which may provide input to the computing systems and MCUs regarding the levels current, voltages, and/or other metrics related to the power systems and loads. The computing systems and/or MCUs may use this information to determine failure states and to determine a return of power from a down or failed power source. As discussed in more detail below, based upon detected information, a computing system and/or MCU may take on or more actions. The actions may include causing one or more switches to be placed into a certain position or setting and may include executing one or more procedures for safety. Some examples of actions that may be taken are provided in the methodology embodiments section, below.

In one or more embodiments, the vehicle DBW system 644 receives inputs from the controller/computing system(s) and interfaces with the vehicle level components of the vehicle 610 (e.g., steering, braking, lights, door locks, etc.). The vehicle DBW system 644 may operate as described with reference to the vehicle control interface and vehicle level components in relation to FIG. 4.

d) Embodiments of Other Systems

Finally, as depicted in FIG. 6, the overall system 600 may also comprise a plurality of additional systems the support various functions or operations of the vehicle. These miscellaneous systems may also need to receive power from the power supply system 602. For example, the power supply system 602 may provide power to monitor(s) 628, cooling system(s) 630, and other vehicle systems 632. These systems may be prioritized (individually and/or collectively) and receive power according to their respective level of priority. In the depicted embodiment of FIG. 6, the miscellaneous systems 604 are supplied by the main and primary power sources but do not receive power if the secondary or tertiary power source are being used—although it shall be noted that different power sourcing configurations may be used.

2. Example Methodology Embodiments a) Example Failure Scenario 1

Figure 8:
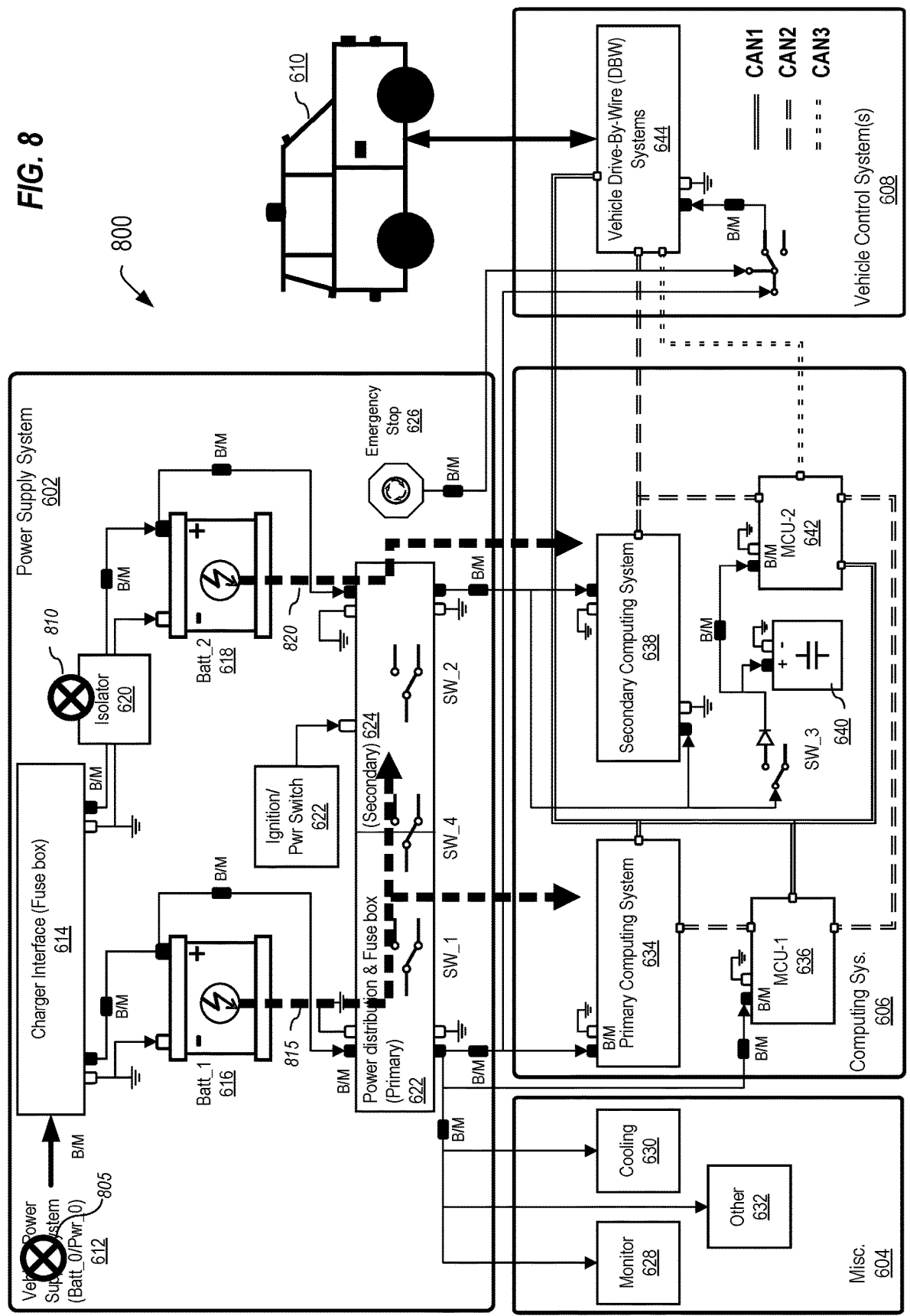
FIG. 8 depicts a first failure scenario, according to embodiments of the present disclosure.
Figure 9:
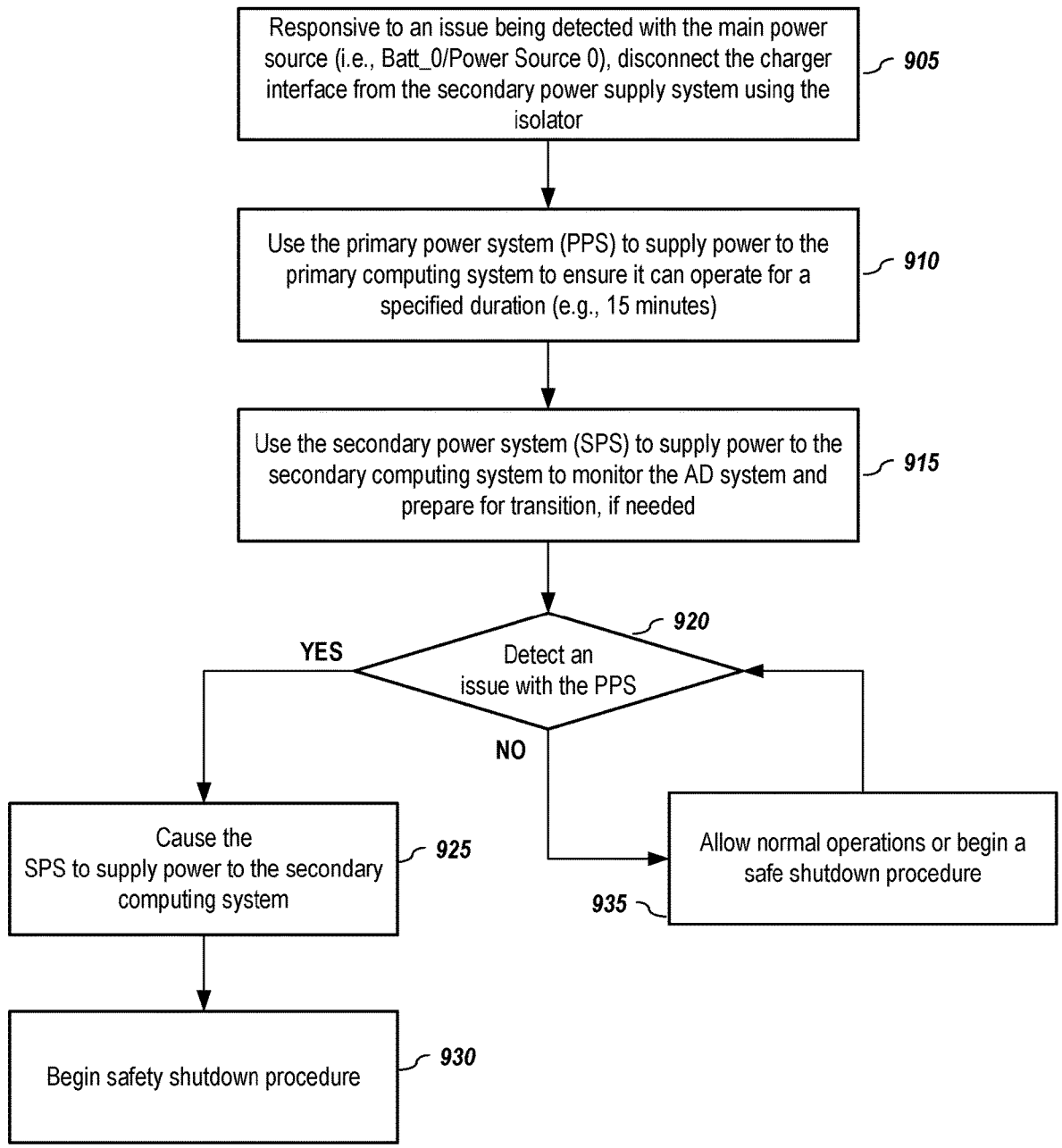
FIG. 9 depicts a methodology that may be employed during the first failure scenario, according to embodiments of the present disclosure.

FIG. 8 depicts a first failure scenario, according to embodiments of the present disclosure, and FIG. 9 depicts a methodology that may be employed during the first failure scenario, according to embodiments of the present disclosure.

In one or more embodiments, responsive to an issue being detected with the main power source (i.e., batt_0/pwr_source_0) 612, in which it is not able to supply 805 sufficient power, the charger interface 614 is disconnected/isolated (905/810) from the secondary power supply system 618 using the isolator 620.

FIG. 8 depicts power flow 815 from the primary power source 616 and a second power flow 820 from the secondary power source 618. The primary power source/system (PPS) 622 may be used (910) to supply power to the primary computing system 634 to ensure that it can operate. Depending upon the implementation, the primary power source may be large enough to allow the vehicle to continue fully operating in autonomous mode. Alternatively, the primary power source may be sized to provide power for just a certain duration (e.g., 15-20 minutes).

In embodiments in which the PPS 616 supplies sufficient power to operate the vehicle, the vehicle may continue normal uses for the current trip (or a set number of trips). In one or more embodiments, the vehicle after a certain trip (e.g., at the end of the current trip) may cause the vehicle to go to a designated location (e.g., home, repair facility, safe parking location, etc.) and not resume operations until the main power source 612 is repaired.

In embodiments in which the PPS 616 supplies power for a limited amount of time, the vehicle's AD system may execute a safe shutdown procedure. For example, the vehicle may identify a nearby location (e.g., home, repair facility, safe parking location, etc.) and cause the vehicle to drive to that location and safely park. In one or more embodiments, the vehicle's AD system may not allow for use of the vehicle until the main power source 612 is repaired.

In one or more embodiments, the secondary power source/system (SPS) 618 may be used to supply power (915) to the secondary computing system to monitor the AD system and prepare for transition as being the computing system, if the primary power source 616 fails or is otherwise insufficient. That is, in one or more embodiments, the power from the primary power source 616 may be monitored (920) to ensure that it is able to supply sufficient power. As long as the PPS 616 is operating within acceptable parameters, the vehicle may operate (935) as normal or execute a safe shutdown procedure, as discussed above. If, however, the PPS 616 fails to operate within acceptable parameters, the SPS 618 is used (925) to supply power to the secondary computing system to take over control of the vehicle control system 608.

Depending upon the implementation, the SPS may be large enough to allow the vehicle to continue operating in autonomous mode. Alternatively, the SPS may be sized to provide power for just a certain duration, and the AD system may execute a safe shutdown procedure, in like manner as described above. In yet another alternative embodiment, the SPS may supply even less power for a shorter duration (e.g., 8 minutes). In such embodiments, the safe shutdown procedure may have a more limited range in which to find a location to safely park.

b) Example Failure Scenario 2

Figure 10:
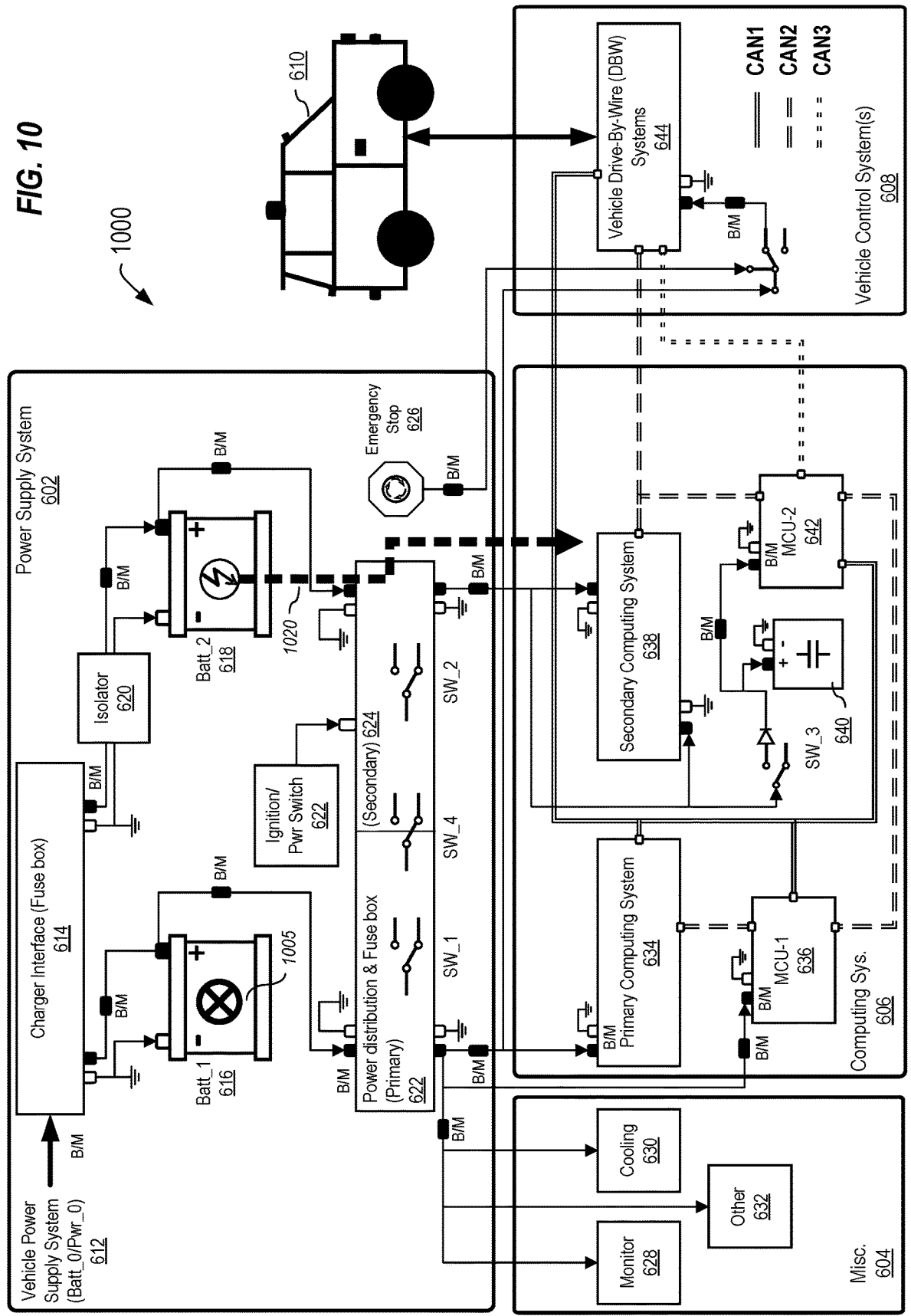
FIG. 10 depicts a second failure scenario, according to embodiments of the present disclosure.
Figure 11:
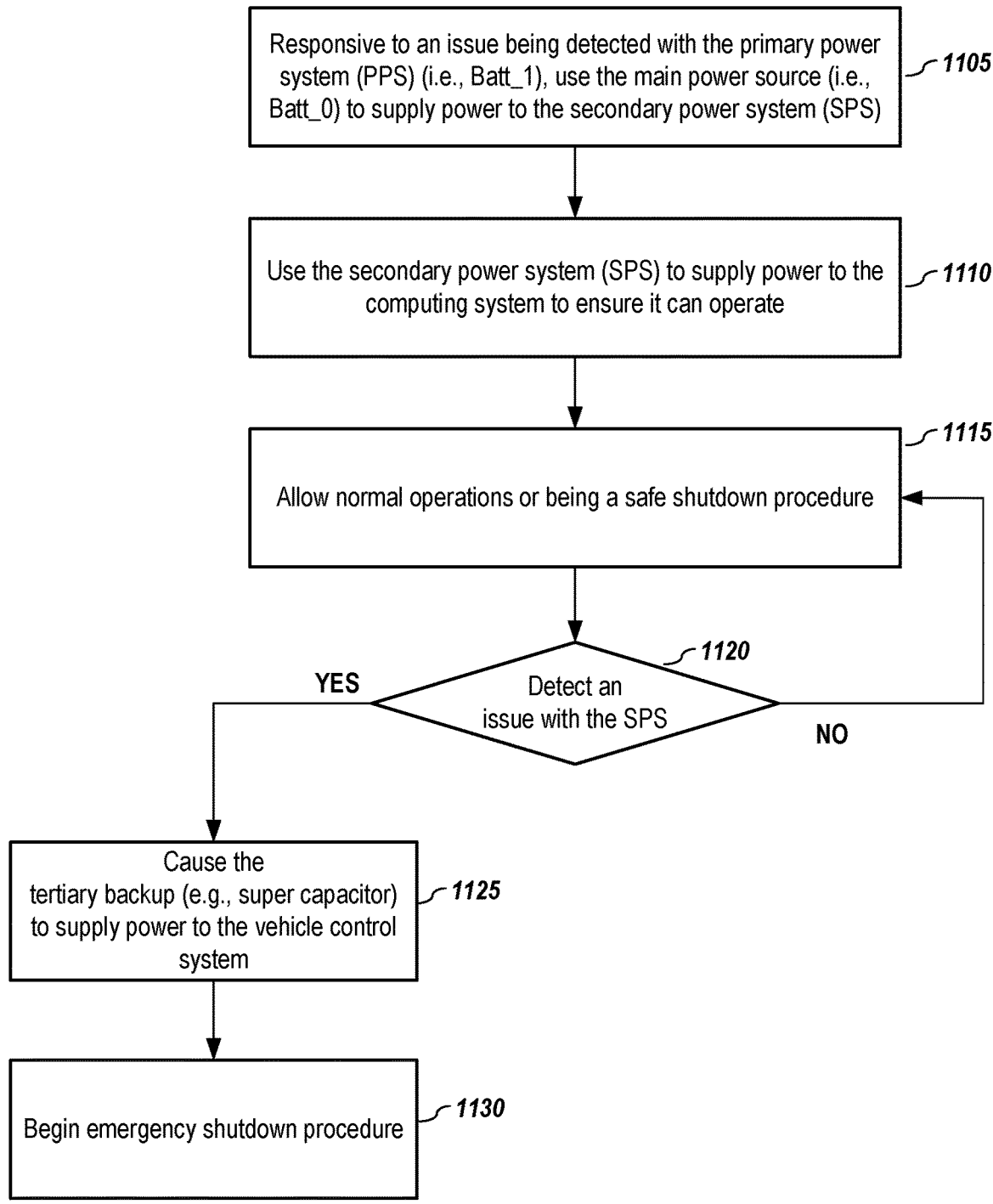
FIG. 11 depicts a methodology that may be employed during the second failure scenario, according to embodiments of the present disclosure.

FIG. 10 depicts a second failure scenario, according to embodiments of the present disclosure, and FIG. 11 depicts a methodology that may be employed during the second failure scenario, according to embodiments of the present disclosure.

In one or more embodiments, responsive to an issue being detected with the primary power source (i.e., batt_1) 616 (PPS), the charger interface 614 causes the main power supply source (i.e., batt_0) 612 to supply (1105) power to the secondary power supply (SPS) (i.e., batt_2) 618. In such a configuration, the isolator 620 may not isolate the SPS from the main power supply 612 (but may isolate from the PPS).

In one or more embodiments, the SPS is used to supply (1110) power to the computing system 606 to ensure it can operate. FIG. 10 depicts power flow 1020 from the secondary power source 618 to the secondary computing system 638. The SPS 618 may supply power to additional components or systems. Depending upon the implementation, the SPS may be large enough to allow the vehicle to continue to operate (1115) normally in an autonomous mode. Alternatively, the SPS may be sized to provide power for just a certain duration (e.g., 8 minutes). In such embodiments, the AD system may execute (1115) a safe shutdown procedure, in similar manner as described above in the prior subsection.

In one or more embodiments, the secondary power source/system (SPS) 618 may be monitored (1120) to determine if there are any issues related to it supplying power. If the SPS 618 is operating within acceptable parameters, the vehicle may operate (1115) as normal or execute a safe shutdown procedure, as discussed above. If, however, the SPS 618 fails to operate within acceptable parameters, a tertiary power supply (e.g., super capacitor 640) may be used (1125) to supply power to the secondary computing system 638 or to a microcontroller unit (e.g., MCU-2 642) to take over control of the vehicle control system 608. In embodiments in which the tertiary power supply 640 has limited power, it may supply limited components or systems (e.g., MCU-2 642), which promptly execute (1130) an emergency shutdown procedure. An emergency shutdown procedure may comprise causing the vehicle to park safely as soon as possible.

c) Example Failure Scenario 3

Figure 12:
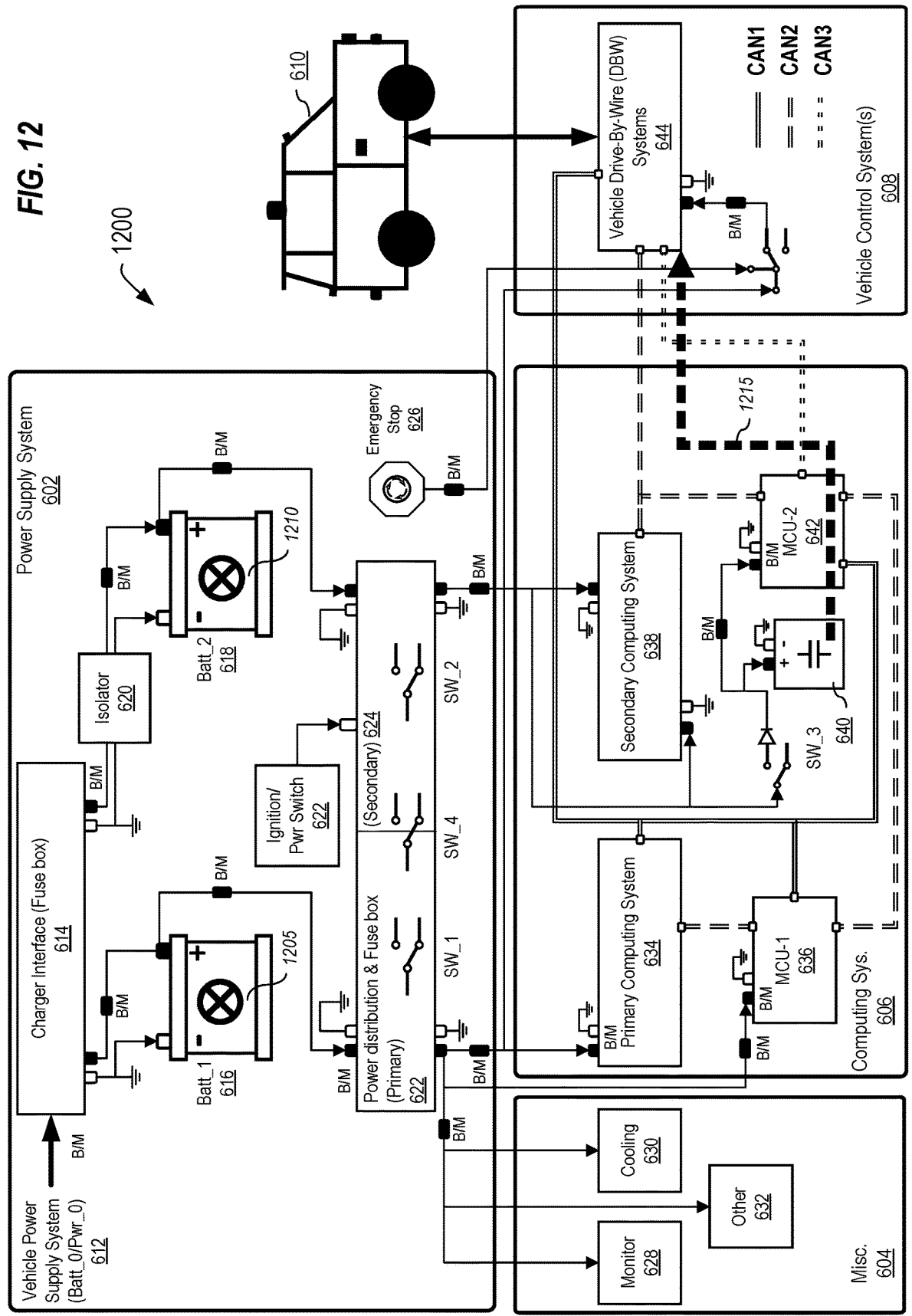
FIG. 12 depicts a third failure scenario, according to embodiments of the present disclosure.
Figure 13:
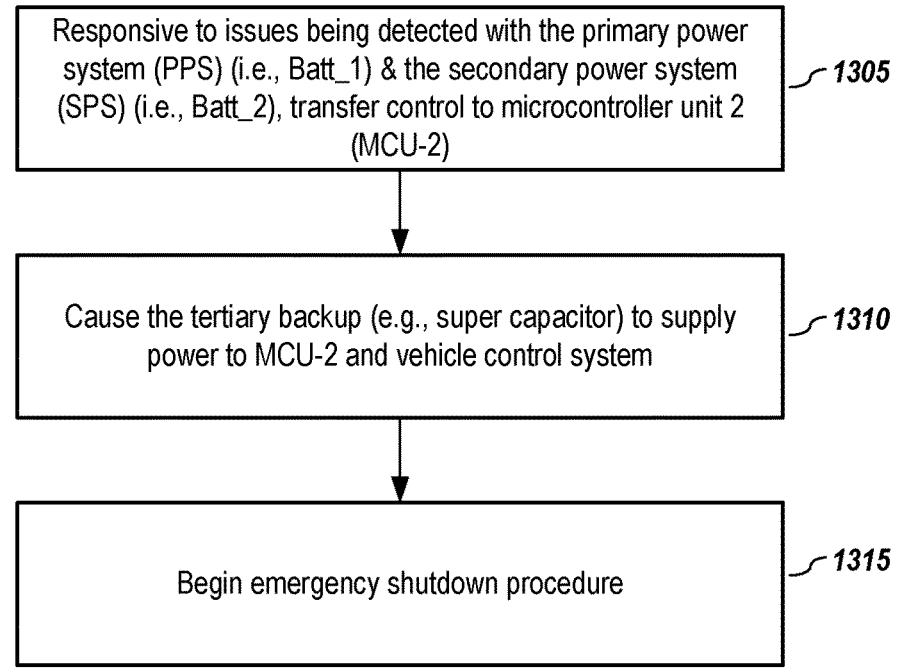
FIG. 13 depicts a methodology that may be employed during the third failure scenario, according to embodiments of the present disclosure.

FIG. 12 depicts a third failure scenario, according to embodiments of the present disclosure, and FIG. 13 depicts a methodology that may be employed during the third failure scenario, according to embodiments of the present disclosure.

In one or more embodiments, responsive to issues being detected with the primary power source (i.e., batt_1) 616 (PPS) and the secondary power source (i.e., batt_2) 618 (SPS), responsibility for providing power is transferred to the tertiary power source (e.g., super capacity) 640. For example, as illustrated in FIG. 12, PPS 616 has a fault 1205, and SPS 618 also has a fault 1210. In one or more embodiments, MCU-2 642 oversees and adjusts controls accordingly; or alternatively, an additional battery management module (BMM) may perform these functions.

In such a configuration, the power flow may be as depicted by arrow 1215. In one or more embodiments, the tertiary power supply (TPS) 640 is used to supply (1310) power to the MCU-2 642. Depending upon the implementation, the TPS may be sized to provide power for a relatively short duration (e.g., less than a minute or even just a few seconds). In such embodiments, the AD system may execute (1315) an emergency shutdown procedure to cause the vehicle to be parked nearly immediately.

d) Additional Method Embodiments

Figure 14:
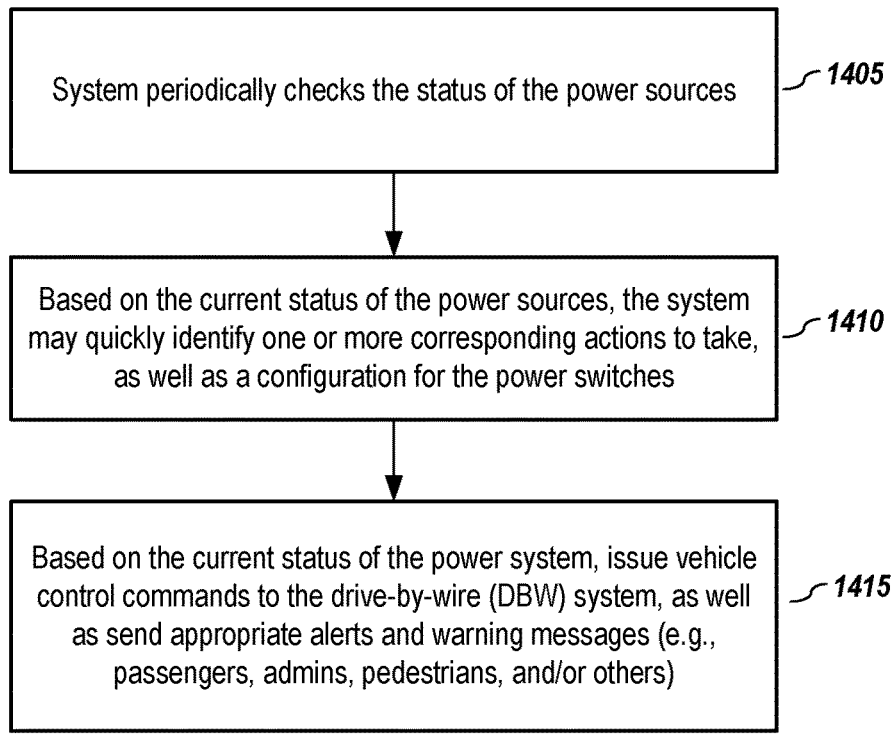
FIG. 14 depicts a general methodology, according to embodiments of the present disclosure.

FIG. 14 depicts a general methodology, according to embodiments of the present disclosure. In one or more embodiments, the system periodically checks (1405) the status of the power sources. The statuses of the various power sources may be checked via one or more of the battery/power monitors. In one or more embodiments, the system may comprise one or more of the computing resources, and the computing systems 634, 638, MCU-1 636, and MCU-2 638 may conduct periodic self-checks. However, in one or more embodiments, the ultimate decision making in controlling the switches may reside with MCU-2 642, a Battery Management Module (BMM), or both (in which, in one or more embodiments, priority may be given to one over the other).

Based on the current status of one or more of the power sources, the system may identify (1410) the corresponding actions the system needs to take, including the direction to switch the power switches. For example, FIG. 16 depicts different scenarios and corresponding actions for configuring the power supply and switches, according to embodiments of the present disclosure. In one or more embodiments, decision making in controlling the switches may reside with MCU-2 642, a battery management module (BMM), or both (in which, in one or more embodiments, priority may be given to one over the other).

In one or more embodiments, based on the current status of the power system, a computing system or MCU may issue (1415) vehicle control commands to the drive-by-wire (DBW) system, as well as send appropriate alerts and warning messages (e.g., passengers, admins, pedestrians, and/or others).

Figure 15:
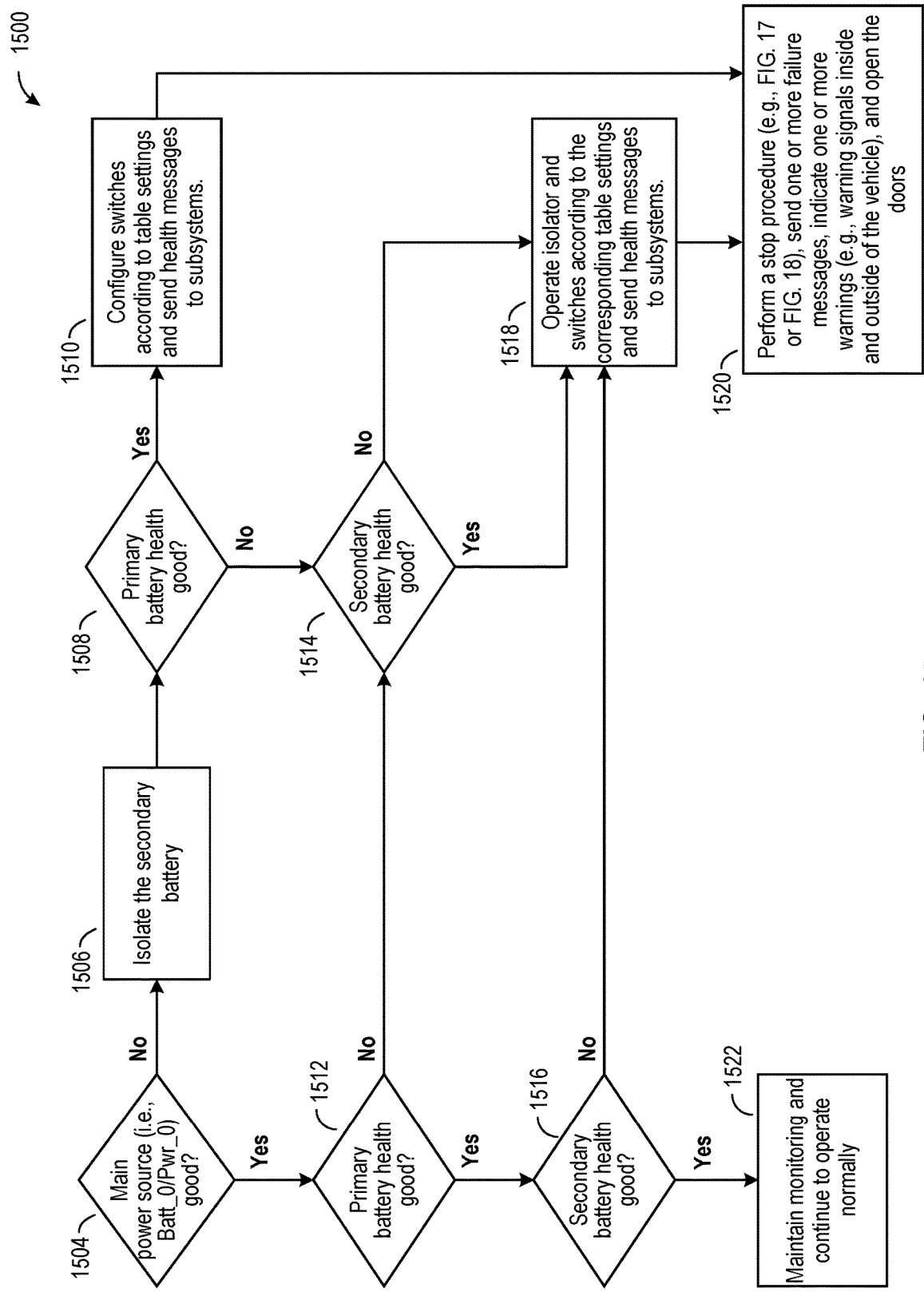
FIG. 15 depicts an alternative general methodology, according to embodiments of the present disclosure.

FIG. 15 depicts an alternative general methodology, according to embodiments of the present disclosure. In one or more embodiments, the main power source (e.g., power source 612) is monitored (1504) to determine whether it is operating within acceptable parameters (e.g., it is supplying sufficient power).

If the main power source is not operating within parameters or is otherwise having a fault, an isolator may be engaged or activated (1506) to separate at least the SPS from the faulty main power supply, and the health of the primary power source (PPS) may be checked (1508).

If the PSP can operate within a set or one or more parameters (i.e., provide sufficient power), the power supply management system may configure (1510) switches (e.g., switches 1-4) according to preset configuration to facilitate desired power source(s) and flow(s). In one or more embodiments, the preset configurations may be stored into memory, such as in a table similar to that depicted in FIG. 16. The system may also send (1510) health messages to subsystems. In one or more embodiments, the health message may hold paramount importance for the AD system. When the system is in good health, it may prevent the monitoring and storage of extensive data from sensors and other logic in memory. Additionally, remote control assistance may be used to avoid allocating additional resources (e.g., human or computing monitor systems) for remote monitoring when the system is healthy. Conversely, in case of an unhealthy system, additional resources may be allocated for thorough checks. More data may be collected and stored for subsequent analyses and debugging processes.

Figure 17:
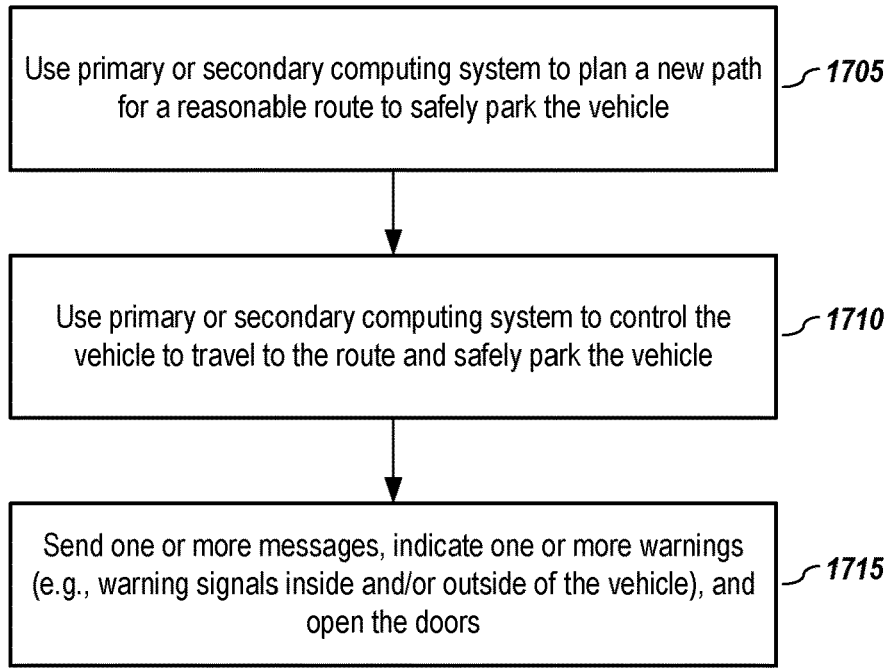
FIG. 17 depicts a safe shutdown procedure, according to embodiments of the present disclosure.
Figure 18:
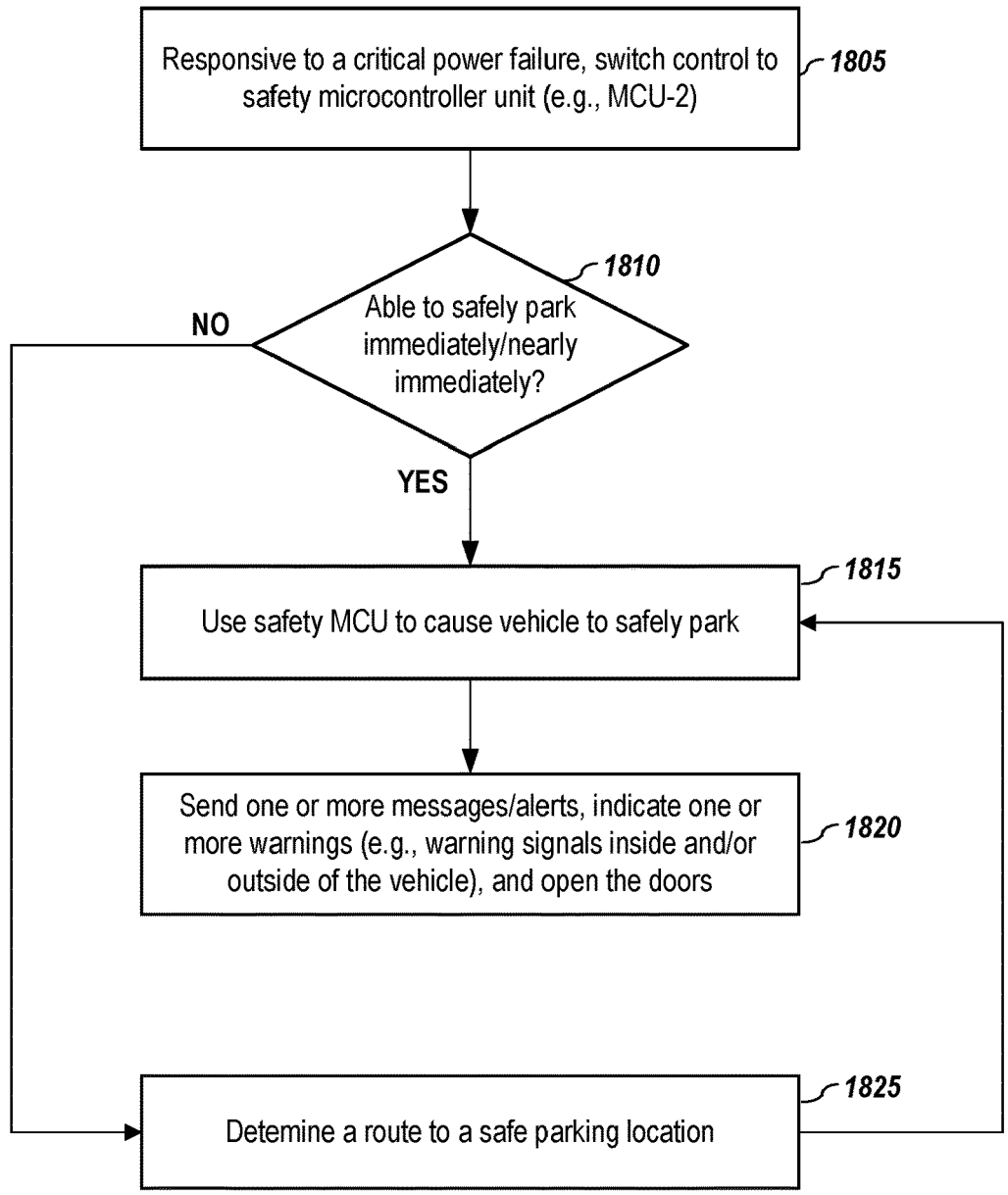
FIG. 18 depicts an emergency shutdown procedure, according to embodiments of the present disclosure.

In one or more embodiments, the vehicle may perform (1520) a shutdown procedure, such as a safety shutdown procedure (e.g., FIG. 17) or an emergency shutdown procedure (e.g., FIG. 18). Alternatively, if the PSP is sufficient to allow normal operation, the vehicle may continue to operate normally with monitoring of at least the PSP and SPS.

However, if the PSP is not operating or cannot operate (1508) within a set or one or more parameters (i.e., provide sufficient power), the health of a secondary power source (PSP) may be checked (1514). If the SPS cannot operate within a set of one or more parameters, the system may configure (1518) the switches according to preset configuration (e.g., FIG. 16) and perform (1520) a stop procedure. Given that the main, primary, and secondary power sources are all compromised, the system may execute an emergency stop procedure (e.g., 8-30 second path planning for a vehicle stop/park command). An embodiment of an emergency stop procedure is depicted in FIG. 18. One or more messages may also be sent (e.g., messages to user, passenger, repairman, roadside assistance, remote user, or others), one or more warnings may be indicated (e.g., warning signals inside and outside of the vehicle, such as hazard lights or messages), and the doors may be opened/unlocked after the vehicle stops.

If the SPS can operate within a set of one or more parameters (i.e., provide sufficient power), the system may ensure that the isolator is activated to separate the SPS from the faulty power supplies and that the power-related switches are in the correct configuration (1518) according to preset configuration (e.g., FIG. 16). Given that the main and primary power sources are faulty, the system may execute (1520), depending upon implementation, a safety stop procedure (e.g., FIG. 17) or an emergency stop procedure (e.g., FIG. 18).

If the main power source is operating (1504) within acceptable parameters, the health of the primary power source (PPS) may be checked (1512). If the PSP cannot operate within a set or one or more parameters (i.e., provide sufficient power), the health of the secondary power source (SPS) may be checked (1514) to determine its status, and steps 1518 and 1520 may be performed as discussed in the prior paragraphs, above.

If the PSP can operate (1512) within a set or one or more parameters, the health of the secondary power source (SPS) may be checked (1516) to determine its status. If the SPS cannot properly supply power or is otherwise faulty, steps 1518 and 1520 may be performed as discussed above given the determined states that the secondary power source has failed.

However, if the SPS is healthy and can supply power, then each of the main, primary, and secondary power supplies are functioning properly. In such situations, the system may continue to monitor (1522) the power sources while allowing the autonomous vehicle to operate normally.

It shall be noted that, while not depicted in FIG. 15, the methodology may also be extended to include monitoring one or more additional power sources (such as a tertiary power 640). In one or more embodiments, actions may be correlated to which power source or set of power sources have failed. The more important a power source or the higher the number of power sources that have failed, the more immediate the shutdown procedure may be. For example, in one or more embodiments, if just the tertiary power source has failed, alerts may be generated to notify one or more individuals, but the vehicle may be permitted to operate as normal. Also, for less severe power source failure issues, in one or more embodiments, the vehicle may be allowed to operate for a certain period of time or number of trips before it will not operate or will only accept trips to repair facilities. Similarly, for more severe failures (e.g., the PPS and/or SPS), the vehicle may be configured to not operate (or may have limited operations) until the issues have been repaired/resolved.

While not depicted, the methods may also include detecting that a previously failed power system has resumed normal operations. In one or more embodiments, if the previously failed power system has resumed normal operations for certain amount of time and/or internal testing show that it is stable, the error may be cleared, and normal operations may resume. However, even under such conditions, one or more alerts or messages may be generated to have the system checked to ensure it is not faulty or intermittently faulty.

While not depicted in the figures, in one or more embodiments, if a power source has failed (e.g., main power source, PPS, and SPS) but is still able to supply some power but not sufficient to support operations, the system may comprises one or more accumulators, capacitors, or trickle-charge batteries that may collect the charge so that it can be used to support one or more functions. For example, in one or more embodiments, the power accumulator may be used to provide a boost or limited recharge to one of the batteries (e.g., PPS or SPS) or the tertiary backup (e.g., super capacitor).

e) Shutdown Method Embodiments

FIG. 17 depicts an example safe shutdown procedure, according to embodiments of the present disclosure. In one or more embodiments, assuming that there has been a failure of at least one important power source (e.g., main power source, PPS, or SPS), the primary or secondary computing system may be used (1705) to plan a path for the vehicle for a reasonable route to safely park the vehicle. The primary or secondary computing system may also be used to control (1710) the vehicle to travel the route and to safely park the vehicle. In addition, one of the computing systems may cause (1715) one or more messages/alerts to be generated, may indicate one or more warnings (e.g., warning signals inside and/or outside of the vehicle), and may open the doors following safe parking of the vehicle.

FIG. 18 depicts an example emergency shutdown procedure, according to embodiments of the present disclosure. In one or more embodiments, the emergency shutdown procedure is typically performed when a critical power supply or set of power supplies have failed. In such situations, the safety of the vehicle (and others around the vehicle) are potentially at risk. Accordingly, it may be preferable to have the vehicle stop as soon as possible.

In one or more embodiments, responsive to a critical power failure (e.g., failure of PPS and SPS), control of the vehicle is switched (1805) to a safety microcontroller unit (e.g., MCU-2 642). In such instances, power for the safety MCU may be provided by a backup power supply for MCU (e.g., tertiary power supply 640).

In one or more embodiments, a determination may be made based upon sensor data (e.g., current operation of the vehicle, objects within vicinity of the vehicle, available safe parking location, etc.) whether the vehicle can park safely immediately/within a very short time duration (e.g., a few seconds). If the vehicle can be parked promptly, the safety MCU is used to safely park (1815) the vehicle. However, if the vehicle cannot be parked immediately (e.g., it is traveling on a road, it is not near a safe parking spot, etc.), the safety MCU determines (1825) a path to a location within a set distance or that can be reached within a set time and directs the vehicle to identified location. Once at the destination, the safety MCU causes the vehicle to park (1815) safely.

In one or more embodiments, the MCU may cause (1820) one or more messages/alerts to be generated, may indicate one or more warnings (e.g., warning signals inside and/or outside of the vehicle), and may open the doors following safe parking of the vehicle.

It shall be noted that the messages/alerts, warnings, or both may be performed once the failure is detected, during the shutdown procedure, and/or after the vehicle is parked. For example, once a failure is detected and a stop procedure is initiated, hazard lights may be activated, and a message may be sent to a contact and/or roadside assistance. The message may include what failed (e.g., which system or systems failed) and the current and/or parked location of the vehicle. One skilled in the art shall recognize other messages and alerts may be used.

D. Computing System Embodiments

In one or more embodiments, aspects of the present patent document may be directed to, may include, or may be implemented on or use one or more computing systems. An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a specialized processor-enabled computing system, a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read-only memory (ROM), and/or other types of memory. Additional components of the computing system may include one or more drives (e.g., hard disk drive, solid-state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 19:
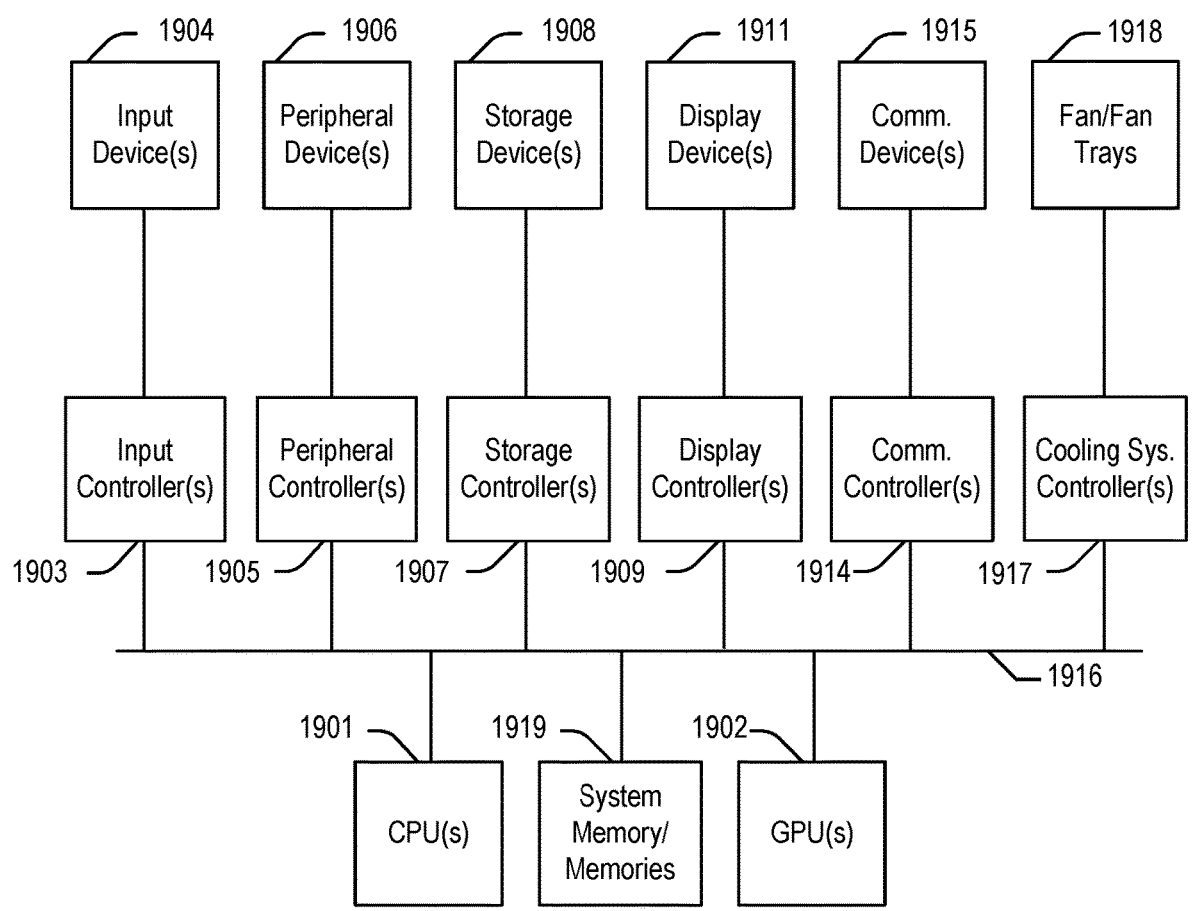
FIG. 19 depicts a simplified block diagram of a computing device, according to embodiments of the present disclosure.

FIG. 19 depicts a simplified block diagram of an information handling system (or computing system), according to embodiments of the present disclosure. It will be understood that the functionalities shown for system 1900 may operate to support various embodiments of a computing system—although it shall be understood that a computing system may be differently configured and include different components, including having fewer or more components as depicted in FIG. 19.

As illustrated in FIG. 19, the computing system 1900 includes one or more CPUs 1901 that provide computing resources and control the computer. CPU 1901 may be implemented with a microprocessor or the like, and may also include one or more graphics processing units (GPU) 1902 and/or a floating-point coprocessor for mathematical computations. In one or more embodiments, one or more GPUs 1902 may be incorporated within the display controller 1909, such as part of a graphics card or cards. The system 1900 may also include a system memory 1919, which may comprise RAM, ROM, or both.

A number of controllers and peripheral devices may also be provided, as shown in FIG. 19. An input controller 1903 represents an interface to various input device(s) 1904. The computing system 1900 may also include a storage controller 1907 for interfacing with one or more storage devices 1908 each of which includes a storage medium such as magnetic tape or disk, or an optical medium that might be used to record programs of instructions for operating systems, utilities, and applications, which may include embodiments of programs that implement various aspects of the present disclosure. Storage device(s) 1908 may also be used to store processed data or data to be processed in accordance with the disclosure. The system 1900 may also include a display controller 1909 for providing an interface to a display device 1911, which may be a cathode ray tube (CRT) display, a thin film transistor (TFT) display, organic light-emitting diode, electroluminescent panel, plasma panel, or any other type of display. The computing system 1900 may also include one or more peripheral controllers or interfaces 1905 for one or more peripherals 1906. Examples of peripherals may include one or more printers, scanners, input devices, output devices, sensors, and the like. A communications controller 1914 may interface with one or more communication devices 1915, which enables the system 1900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1900 comprises one or more fans or fan trays 1918 and a cooling subsystem controller or controllers 1917 that monitors thermal temperature(s) of the system 1900 (or components thereof) and operates the fans/fan trays 1918 to help regulate the temperature.

In the illustrated system, all major system components may connect to a bus 1916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented/processor-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

Note that some or all of the components as shown and described above may be implemented in software, hardware, or a combination thereof. For example, such components can be implemented as software installed and stored in a persistent storage device, which can be loaded and executed in a memory by a processor to carry out the processes or operations described throughout this application. Alternatively, such components can be implemented as executable code programmed or embedded into dedicated hardware such as an integrated circuit (e.g., an application-specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations. The specification and drawings are, accordingly, to be regarded in an illustrative sense rather than a restrictive sense.

What is claimed is:

1. A power supply system of a vehicle, comprising:
    a power supply comprising:
        a charger interface configured to receive power from a main power supply;
        a primary backup power supply coupled to the charger interface, the primary backup power supply being capable of supplying power to a primary computing system;
        a secondary backup power supply coupled to the charger interface, the secondary backup power supply being capable of supplying power to a secondary computing system used to monitor an autonomous driving system and prepare to replace the primary computing system;
        a tertiary backup power supply coupled via one or more switches to at least one of the main power supply, the charger interface, the primary backup power, and the secondary backup power supply, the tertiary backup power supply being capable of supplying power to a tertiary computing system; and
        an isolator coupled between the charger interface and the secondary backup power supply, in which the isolator electrically isolates the secondary backup power supply from the charger interface when the main power supply or the primary backup power supply are faulty; and
    a controller configured to perform steps comprising:
        monitoring at least the main power supply, the primary backup power supply, and the secondary backup power supply;
        responsive to detecting an issue with the main power supply:
            disconnecting the charger interface from the secondary backup power supply via the isolator; and
            changing one or more of the switches according to a preset configuration to facilitate the primary backup power supply supplying power to the primary computing system and to facilitate the secondary backup power supply supplying power to the secondary computing system to monitor the autonomous driving system;
        responsive to detecting an issue with the primary backup power supply, causing the secondary backup power supply to supply power to the secondary computing system, which allows the vehicle to continue to operate in an autonomous mode for a certain duration and/or initiates a safety shutdown procedure; and
        responsive to detecting an issue with the secondary backup power supply, causing the tertiary backup power supply to supply power to the tertiary computing system that initiates the safety shutdown procedure.

2. The power supply system of claim 1 wherein the tertiary backup power supply is a capacitor.

3. The power supply system of claim 1 wherein the tertiary computing system that initiates the safety shutdown procedure is a microcontroller unit.

4. The power supply system of claim 1 wherein the safety shutdown procedure is an emergency shutdown procedure which causes the vehicle to be parked within a short time duration that is related to a duration of power available from the tertiary backup power supply.

5. A method for supplying power to one or more computing systems of a vehicle, the method comprising:

receiving input from one or more sensors related to a power supply system comprising:
  a charger interface configured to receive power from a main power supply;
  a primary backup power supply coupled to the charger interface, the primary backup power supply being capable of supplying power to a primary computing system;
  a secondary backup power supply coupled to the charger interface, the secondary backup power supply being capable of supplying power to a secondary computing system used to monitor an autonomous driving system and prepare to replace the primary computing system;
  a tertiary backup power supply coupled via one or more switches to at least one of the main power supply, the charger interface, the primary backup power, and the secondary backup power supply, the tertiary backup power supply being capable of supplying power to a tertiary computing system; and
  an isolator coupled between the charger interface and the secondary backup power supply, in which the isolator electrically isolates the secondary backup power supply from the charger interface when the main power supply or the primary backup power supply are faulty; and
responsive to detecting, using input from at least one of the one or more sensors, a fault with at least one of the main power supply, the primary backup power supply, and the secondary backup power supply:
  identifying, based upon the detected fault or faults, a corresponding configuration for the power supply system to supply power to one or more components;
  responsive to detecting an issue with the main power supply:
    disconnecting the charger interface from the secondary backup power supply via the isolator; and
    changing one or more of the switches according to a preset configuration to facilitate the primary backup power supply supplying power to the primary computing system and to facilitate the secondary backup power supply supplying power to the secondary computing system to monitor the autonomous driving system;
  responsive to detecting an issue with the primary backup power supply, causing the secondary backup power supply to supply power to the secondary computing system, which allows the vehicle to continue to operate in an autonomous mode for a certain duration and/or initiates a safety shutdown procedure; and
  responsive to detecting an issue with the secondary backup power supply, causing the tertiary backup power supply to supply power to the tertiary computing system that initiates the safety shutdown procedure.

6. The method of claim 5 wherein the tertiary backup power supply is a capacitor.

7. The method of claim 5 wherein the tertiary computing system that initiates the safety shutdown procedure is a microcontroller unit.

8. The method of claim 5 wherein the safety shutdown procedure is an emergency shutdown procedure that causes the vehicle to be parked within a short time duration that is related to a duration of power available from the tertiary backup power supply.

9. A non-transitory computer-readable medium comprising one or more sequences of instructions which, when executed causes steps to be performed comprising:
  receiving input from one or more sensors related to a power supply system comprising:
    a charger interface configured to receive power from a main power supply;
    a primary backup power supply coupled to the charger interface, the primary backup power supply being capable of supplying power to a primary computing system;
    a secondary backup power supply coupled to the charger interface, the secondary backup power supply being capable of supplying power to a secondary computing system used to monitor an autonomous driving system and prepare to replace the primary computing system;
    a tertiary backup power supply coupled via one or more switches to at least one of the main power supply, the charger interface, the primary backup power, and the secondary backup power supply, the tertiary backup power supply being capable of supplying power to a tertiary computing system; and
    an isolator coupled between the charger interface and the secondary backup power supply, in which the isolator electrically isolates the secondary backup power supply from the charger interface when the main power supply or the primary backup power supply are faulty; and
  responsive to detecting, using input from at least one of the one or more sensors, a fault with at least one of the main power supply, the primary backup power supply, and the secondary backup power supply:
    identifying, based upon the detected fault or faults, a corresponding configuration for the power supply system to supply power to one or more components;
    responsive to detecting an issue with the main power supply:
      disconnecting the charger interface from the secondary backup power supply via the isolator; and
      changing one or more of the switches according to a preset configuration to facilitate the primary backup power supply supplying power to the primary computing system and to facilitate the secondary backup power supply supplying power to the secondary computing system to monitor the autonomous driving system;
    responsive to detecting an issue with the primary backup power supply, causing the secondary backup power supply to supply power to the secondary computing system, which allows the vehicle to continue to operate in an autonomous mode for a certain duration and/or initiates a safety shutdown procedure; and
    responsive to detecting an issue with the secondary backup power supply, causing the tertiary backup power supply to supply power to the tertiary computing system that initiates the safety shutdown procedure.

10. The non-transitory computer-readable medium of claim 9 wherein the tertiary backup power supply is a capacitor.

11. The non-transitory computer-readable medium of claim 9 wherein the tertiary computing system that initiates the safety shutdown procedure is a microcontroller unit.

12. The non-transitory computer-readable medium of claim 9 wherein the safety shutdown procedure is an emergency shutdown procedure that causes the vehicle to be parked within a short time duration that is related to a duration of power available from the tertiary backup power supply.

* * * * *